(12) United States Patent
Collins

(10) Patent No.: US 8,786,631 B1
(45) Date of Patent: Jul. 22, 2014

(54) SYSTEM AND METHOD FOR TRANSFERRING TRANSPARENCY INFORMATION IN A VIDEO ENVIRONMENT

(75) Inventor: Eddie Collins, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 13/098,430

(22) Filed: Apr. 30, 2011

(51) Int. Cl.
*G09G 5/00* (2006.01)
*H04N 9/74* (2006.01)

(52) U.S. Cl.
USPC .................... 345/629; 345/545; 348/584

(58) Field of Classification Search
CPC ..... H04N 9/75; H04N 5/272; G09G 2360/12; G06T 15/0005
See application file for complete search history.

(56) References Cited

U.S. PATENT DOCUMENTS

| | | |
|---|---|---|
| 2,911,462 A | 11/1959 | Brady |
| D212,798 S | 11/1968 | Dreyfuss |
| 3,793,489 A | 2/1974 | Sank |
| 3,909,121 A | 9/1975 | De Mesquita Cardoso |
| 4,400,724 A | 8/1983 | Fields |
| 4,473,285 A | 9/1984 | Winter |
| 4,494,144 A | 1/1985 | Brown |
| 4,750,123 A | 6/1988 | Christian |
| 4,815,132 A | 3/1989 | Minami |
| 4,827,253 A | 5/1989 | Maltz |
| 4,853,764 A | 8/1989 | Sutter |
| 4,890,314 A | 12/1989 | Judd et al. |
| 4,961,211 A | 10/1990 | Tsugane et al. |
| 4,994,912 A * | 2/1991 | Lumelsky et al. ............ 348/441 |
| 5,003,532 A | 3/1991 | Ashida et al. |
| 5,020,098 A | 5/1991 | Celli |
| 5,136,652 A | 8/1992 | Jibbe et al. |
| 5,187,571 A | 2/1993 | Braun et al. |
| 5,200,818 A | 4/1993 | Neta et al. |
| 5,249,035 A | 9/1993 | Yamanaka |
| 5,255,211 A | 10/1993 | Redmond |
| D341,848 S | 11/1993 | Bigelow et al. |
| 5,268,734 A | 12/1993 | Parker et al. |

(Continued)

FOREIGN PATENT DOCUMENTS

| | | |
|---|---|---|
| CN | 101953158 A | 1/2011 |
| CN | 102067593 | 5/2011 |

(Continued)

OTHER PUBLICATIONS

U.S. Appl. No. 13/298,022, filed Nov. 16, 2011, entitled "System and Method for Alerting a Participant in a Video Conference," Inventor(s): TiongHu Lian, et al.

(Continued)

*Primary Examiner* — Kee M Tung
*Assistant Examiner* — Nicholas R Wilson
(74) *Attorney, Agent, or Firm* — Patent Capital Group

(57) ABSTRACT

A method is provided in one example and includes receiving overlay data at a dual frame buffer module, which interacts with a video data buffer and an alpha data buffer. The method can also include storing the overlay data as a first video data in the video data buffer if an indicator is not present in the overlay data; and storing the overlay data as a second video data in the alpha data buffer if the indicator is present. In more specific implementations, the indicator is a pixel in a non-viewable area of the overlay data.

19 Claims, 5 Drawing Sheets

(56) References Cited

U.S. PATENT DOCUMENTS

| | | |
|---|---|---|
| 5,317,405 A | 5/1994 | Kuriki et al. |
| 5,337,363 A | 8/1994 | Platt |
| 5,347,363 A | 9/1994 | Yamanaka |
| 5,351,067 A * | 9/1994 | Lumelsky et al. .......... 345/561 |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,506,604 A * | 4/1996 | Nally et al. ................ 345/603 |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A * | 12/1996 | Moffat ......................... 345/539 |
| 5,612,733 A | 3/1997 | Flohr |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,715,377 A | 2/1998 | Fukushima et al. |
| D391,935 S | 3/1998 | Sakaguchi et al. |
| D392,269 S | 3/1998 | Mason et al. |
| 5,729,471 A | 3/1998 | Jain et al. |
| 5,737,011 A | 4/1998 | Lukacs |
| 5,748,121 A | 5/1998 | Romriell |
| 5,760,826 A | 6/1998 | Nayar |
| 5,790,182 A | 8/1998 | Hilaire |
| 5,796,724 A | 8/1998 | Rajamani et al. |
| 5,815,196 A | 9/1998 | Alshawi |
| 5,818,514 A | 10/1998 | Duttweiler et al. |
| 5,821,985 A | 10/1998 | Iizawa |
| 5,889,499 A * | 3/1999 | Nally et al. ..................... 345/7 |
| 5,894,321 A | 4/1999 | Downs et al. |
| D410,447 S | 6/1999 | Chang |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 6,069,658 A | 5/2000 | Watanabe |
| 6,088,045 A * | 7/2000 | Lumelsky et al. .......... 345/531 |
| 6,097,441 A | 8/2000 | Allport |
| 6,101,113 A | 8/2000 | Paice |
| 6,124,896 A | 9/2000 | Kurashige |
| 6,148,092 A | 11/2000 | Qian |
| 6,167,162 A | 12/2000 | Jacquin et al. |
| 6,172,703 B1 | 1/2001 | Lee |
| 6,173,069 B1 | 1/2001 | Daly et al. |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,266,082 B1 | 7/2001 | Yonezawa et al. |
| 6,266,098 B1 | 7/2001 | Cove et al. |
| 6,285,392 B1 | 9/2001 | Satoda et al. |
| 6,292,575 B1 | 9/2001 | Bortolussi et al. |
| 6,356,589 B1 | 3/2002 | Gebler et al. |
| 6,380,539 B1 | 4/2002 | Edgar |
| 6,424,377 B1 | 7/2002 | Driscoll, Jr. |
| 6,430,222 B1 | 8/2002 | Okadia |
| 6,459,451 B2 | 10/2002 | Driscoll et al. |
| 6,462,767 B1 | 10/2002 | Obata et al. |
| 6,493,032 B1 | 12/2002 | Wallerstein et al. |
| 6,507,356 B1 | 1/2003 | Jackel et al. |
| 6,573,904 B1 * | 6/2003 | Chun et al. .................. 345/629 |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| 6,611,281 B2 | 8/2003 | Strubbe |
| 6,680,856 B2 | 1/2004 | Schreiber |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| 6,751,106 B2 | 6/2004 | Zhang et al. |
| D492,692 S | 7/2004 | Fallon et al. |
| 6,763,226 B1 | 7/2004 | McZeal |
| 6,768,722 B1 | 7/2004 | Katseff et al. |
| 6,774,927 B1 | 8/2004 | Cohen et al. |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,806,898 B1 | 10/2004 | Toyama et al. |
| 6,807,280 B1 | 10/2004 | Stroud et al. |
| 6,831,653 B2 * | 12/2004 | Kehlet et al. ................ 345/629 |
| 6,844,990 B2 | 1/2005 | Artonne et al. |
| 6,850,266 B1 | 2/2005 | Trinca |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,963,653 B1 | 11/2005 | Miles |
| 6,980,526 B2 | 12/2005 | Jang et al. |
| 6,985,178 B1 | 1/2006 | Morita et al. |
| 6,989,754 B2 | 1/2006 | Kiscanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,031,311 B2 | 4/2006 | MeLampy et al. |
| 7,043,528 B2 | 5/2006 | Schmitt et al. |
| 7,046,862 B2 | 5/2006 | Ishizaka et al. |
| 7,057,636 B1 | 6/2006 | Cohen-Solal et al. |
| 7,057,662 B2 | 6/2006 | Malzbender |
| 7,061,896 B2 | 6/2006 | Jabbari et al. |
| 7,072,504 B2 | 7/2006 | Miyano et al. |
| 7,072,833 B2 | 7/2006 | Rajan |
| 7,080,157 B2 | 7/2006 | McCanne |
| 7,092,002 B2 | 8/2006 | Ferren et al. |
| 7,095,455 B2 | 8/2006 | Jordan et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| 7,158,674 B2 | 1/2007 | Suh |
| 7,161,942 B2 | 1/2007 | Chen et al. |
| D539,243 S | 3/2007 | Chiu et al. |
| 7,197,008 B1 | 3/2007 | Shabtay et al. |
| D541,773 S | 5/2007 | Chong et al. |
| D542,247 S | 5/2007 | Kinoshita et al. |
| 7,221,260 B2 | 5/2007 | Berezowski et al. |
| D545,314 S | 6/2007 | Kim |
| 7,239,338 B2 | 7/2007 | Krisbergh et al. |
| 7,246,118 B2 | 7/2007 | Chastain et al. |
| D550,635 S | 9/2007 | DeMaio et al. |
| D551,184 S | 9/2007 | Kanou et al. |
| 7,269,292 B2 | 9/2007 | Steinberg |
| 7,274,555 B2 | 9/2007 | Kim et al. |
| D555,610 S | 11/2007 | Yang et al. |
| D559,265 S | 1/2008 | Armstrong et al. |
| D560,681 S | 1/2008 | Fletcher |
| D561,130 S | 2/2008 | Won et al. |
| 7,336,299 B2 | 2/2008 | Kostrzewski |
| D567,202 S | 4/2008 | Rieu Piquet |

(56) References Cited

U.S. PATENT DOCUMENTS

| | | |
|---|---|---|
| 7,352,809 B2 | 4/2008 | Wenger et al. |
| 7,353,279 B2 | 4/2008 | Durvasula et al. |
| 7,359,731 B2 | 4/2008 | Choksi |
| 7,399,095 B2 | 7/2008 | Rondinelli |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| 7,450,134 B2 * | 11/2008 | Maynard et al. ............ 345/589 |
| 7,471,320 B2 | 12/2008 | Malkin et al. |
| 7,477,657 B1 | 1/2009 | Murphy et al. |
| D588,560 S | 3/2009 | Mellingen et al. |
| 7,505,036 B1 * | 3/2009 | Baldwin .................. 345/421 |
| 7,518,051 B2 | 4/2009 | Redmann |
| D592,621 S | 5/2009 | Han |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| 7,575,537 B2 | 8/2009 | Ellis |
| 7,577,246 B2 | 8/2009 | Idan et al. |
| D602,453 S | 10/2009 | Ding et al. |
| 7,607,101 B1 | 10/2009 | Barrus |
| 7,616,226 B2 | 11/2009 | Roessler et al. |
| 7,646,419 B2 | 1/2010 | Cernasov |
| D610,560 S | 2/2010 | Chen |
| 7,679,639 B2 | 3/2010 | Harrell et al. |
| 7,692,680 B2 | 4/2010 | Graham et al. |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,716,283 B2 | 5/2010 | Thukral |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| D626,102 S | 10/2010 | Buzzard et al. |
| D626,103 S | 10/2010 | Buzzard et al. |
| D628,175 S | 11/2010 | Desai et al. |
| 7,839,434 B2 | 11/2010 | Ciudad et al. |
| D628,968 S | 12/2010 | Desai et al. |
| 7,855,726 B2 | 12/2010 | Ferren et al. |
| 7,861,189 B2 | 12/2010 | Watanabe et al. |
| 7,889,851 B2 | 2/2011 | Shah et al. |
| 7,894,531 B1 | 2/2011 | Cetin et al. |
| D635,569 S | 4/2011 | Park |
| D635,975 S | 4/2011 | Seo et al. |
| D636,359 S | 4/2011 | Buzzard et al. |
| D636,747 S | 4/2011 | Buzzard et al. |
| 7,920,158 B1 | 4/2011 | Beck et al. |
| 7,939,959 B2 | 5/2011 | Wagoner |
| 7,990,422 B2 | 8/2011 | Ahiska et al. |
| 8,000,559 B2 | 8/2011 | Kwon |
| 8,077,857 B1 | 12/2011 | Lambert |
| 8,081,346 B1 | 12/2011 | Anup et al. |
| 8,086,076 B2 | 12/2011 | Tian et al. |
| 8,135,068 B1 | 3/2012 | Alvarez |
| 8,179,419 B2 | 5/2012 | Girish et al. |
| 8,219,404 B2 | 7/2012 | Weinberg et al. |
| 8,259,155 B2 | 9/2012 | Marathe et al. |
| D669,086 S | 10/2012 | Boyer et al. |
| D669,088 S | 10/2012 | Boyer et al. |
| 8,289,363 B2 | 10/2012 | Buckler |
| 8,299,979 B2 | 10/2012 | Rambo et al. |
| 8,315,466 B2 | 11/2012 | El-Maleh et al. |
| 8,363,719 B2 | 1/2013 | Nakayama |
| 8,436,888 B1 | 5/2013 | Baldino et al. |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0248652 A1 | 11/2005 | Firestone et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |
| 2006/0038878 A1 | 2/2006 | Takashima et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0126894 A1 | 6/2006 | Mori |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0233120 A1 | 10/2006 | Eshel et al. |
| 2006/0256187 A1 | 11/2006 | Sheldon et al. |
| 2006/0284786 A1 | 12/2006 | Takano et al. |
| 2006/0289772 A1 | 12/2006 | Johnson et al. |
| 2007/0019621 A1 | 1/2007 | Perry et al. |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0080845 A1 | 4/2007 | Amand |

(56) References Cited

U.S. PATENT DOCUMENTS

| | | |
|---|---|---|
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0159523 A1 | 7/2007 | Hillis et al. |
| 2007/0183661 A1 | 8/2007 | El-Maleh et al. |
| 2007/0188597 A1 | 8/2007 | Kenoyer et al. |
| 2007/0189219 A1 | 8/2007 | Navoli et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0206602 A1 | 9/2007 | Halabi et al. |
| 2007/0211716 A1 | 9/2007 | Oz et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0285505 A1 | 12/2007 | Korneliussen |
| 2008/0043041 A2 | 2/2008 | Hedenstroem et al. |
| 2008/0044064 A1 | 2/2008 | His |
| 2008/0068446 A1 | 3/2008 | Barkley et al. |
| 2008/0077390 A1 | 3/2008 | Nagao |
| 2008/0084429 A1 | 4/2008 | Wissinger |
| 2008/0136896 A1 | 6/2008 | Graham et al. |
| 2008/0151038 A1 | 6/2008 | Khouri et al. |
| 2008/0153537 A1 | 6/2008 | Khawand et al. |
| 2008/0167078 A1 | 7/2008 | Eibye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0266380 A1 | 10/2008 | Gorzynski et al. |
| 2008/0267282 A1 | 10/2008 | Kalipatnapu et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0003723 A1 | 1/2009 | Kokemohr |
| 2009/0009593 A1 | 1/2009 | Cameron et al. |
| 2009/0051756 A1 | 2/2009 | Trachtenberg |
| 2009/0079812 A1 | 3/2009 | Crenshaw et al. |
| 2009/0115723 A1 | 5/2009 | Henty |
| 2009/0122867 A1 | 5/2009 | Mauchly et al. |
| 2009/0129753 A1 | 5/2009 | Wagenlander |
| 2009/0174764 A1 | 7/2009 | Chadha et al. |
| 2009/0193345 A1 | 7/2009 | Wensley et al. |
| 2009/0207179 A1 | 8/2009 | Huang et al. |
| 2009/0207233 A1 | 8/2009 | Mauchly et al. |
| 2009/0207234 A1 | 8/2009 | Chen et al. |
| 2009/0244257 A1 | 10/2009 | MacDonald et al. |
| 2009/0256901 A1 | 10/2009 | Mauchly et al. |
| 2009/0279476 A1 | 11/2009 | Li et al. |
| 2009/0322082 A1 | 12/2009 | Wagoner et al. |
| 2009/0324023 A1 | 12/2009 | Tian et al. |
| 2010/0008373 A1 | 1/2010 | Xiao et al. |
| 2010/0014530 A1 | 1/2010 | Cutaia |
| 2010/0027907 A1 | 2/2010 | Cherna et al. |
| 2010/0042281 A1 | 2/2010 | Filla |
| 2010/0079355 A1 | 4/2010 | Kilpatrick et al. |
| 2010/0082557 A1 | 4/2010 | Gao et al. |
| 2010/0118112 A1 | 5/2010 | Nimri et al. |
| 2010/0123770 A1 | 5/2010 | Friel et al. |
| 2010/0149301 A1 | 6/2010 | Lee et al. |
| 2010/0153853 A1 | 6/2010 | Dawes et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1 | 8/2010 | Zhang et al. |
| 2010/0202285 A1 | 8/2010 | Cohen et al. |
| 2010/0205281 A1 | 8/2010 | Porter et al. |
| 2010/0208078 A1 | 8/2010 | Tian et al. |
| 2010/0225732 A1 | 9/2010 | De Beer et al. |
| 2010/0225735 A1 | 9/2010 | Shaffer et al. |
| 2010/0241845 A1 | 9/2010 | Alonso |
| 2010/0259619 A1 | 10/2010 | Nicholson |
| 2010/0268843 A1 | 10/2010 | Van Wie et al. |
| 2010/0277563 A1 | 11/2010 | Gupta et al. |
| 2010/0283829 A1 | 11/2010 | De Beer et al. |
| 2010/0302345 A1 | 12/2010 | Baldino et al. |
| 2010/0316232 A1 | 12/2010 | Acero et al. |
| 2011/0008017 A1 | 1/2011 | Gausereide |
| 2011/0037636 A1 | 2/2011 | Alexander |
| 2011/0039506 A1 | 2/2011 | Lindahl et al. |
| 2011/0063440 A1 | 3/2011 | Neustaedter et al. |
| 2011/0063467 A1 | 3/2011 | Tanaka |
| 2011/0085016 A1 | 4/2011 | Kristiansen et al. |
| 2011/0090303 A1 | 4/2011 | Wu et al. |
| 2011/0105220 A1 | 5/2011 | Hill et al. |
| 2011/0109642 A1 | 5/2011 | Chang et al. |
| 2011/0193982 A1 | 8/2011 | Kook et al. |
| 2011/0242266 A1 | 10/2011 | Blackburn et al. |
| 2011/0249086 A1 | 10/2011 | Guo et al. |
| 2011/0276901 A1 | 11/2011 | Zambetti et al. |
| 2012/0026278 A1 | 2/2012 | Goodman et al. |
| 2012/0038742 A1 | 2/2012 | Robinson et al. |
| 2012/0106428 A1 | 5/2012 | Schlicht et al. |
| 2012/0143605 A1 | 6/2012 | Thorsen et al. |
| 2012/0169838 A1 | 7/2012 | Sekine |
| 2012/0287302 A1 | 11/2012 | Tian et al. |

FOREIGN PATENT DOCUMENTS

| | | |
|---|---|---|
| EP | 502600 A2 | 9/1992 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 2277308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 | 2/2005 |
| WO | WO 2006/072755 | 7/2006 |
| WO | WO2007/106157 | 9/2007 |
| WO | WO2007/123946 | 11/2007 |
| WO | WO 2007/123960 A2 | 11/2007 |
| WO | WO2008/039371 | 4/2008 |
| WO | WO 2008/040258 | 4/2008 |
| WO | WO 2008/101117 | 8/2008 |
| WO | WO 2008/118887 | 10/2008 |
| WO | WO 2009/102503 | 8/2009 |
| WO | WO 2009/120814 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |

(56) References Cited

FOREIGN PATENT DOCUMENTS

| WO | WO2012/068008 | 5/2012 |
|---|---|---|
| WO | WO2012/068010 | 5/2012 |
| WO | WO2012/068485 | 5/2012 |

OTHER PUBLICATIONS

"Cisco Expo Germany 2009 Opening," Posted on YouTube on May 4, 2009; http://www.youtube.com/watch?v=SDKsaSlz4MK; 2 pages.
"Eye Tracking," from Wikipedia, (printed on Aug. 31, 2011) 12 pages; http://en.wikipedia.org/wiki/Eye_tracker.
"Infrared Cameras TVS-200-EX," [retrieved and printed on May 24, 2010] http://www.electrophysics.com/Browse/Brw_ProductLineCategory.asp?CategoryID=184&Area=IS; 2 pages.
"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.
"Vocative Case," from Wikipedia, [retrieved and printed on Mar. 3, 2011] 11 pages; http://en.wikipedia.org/wiki/Vocative_case.
"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.
"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages. http://www.d.umn.edu/unirel/homepage/05/eyegaze.html.
"Real-time Hand Motion/Gesture Detection for HCI-Demo 2," video clip, YouTube, posted Dec. 17, 2008 by smmy0705, 1 page; www.youtube.com/watch?v=mLT4CFLli8A&feature=related.
"Simple Hand Gesture Recognition," video clip, YouTube, posted Aug. 25, 2008 by pooh8210, 1 page; http://www.youtube.com/watch?v=F8GVeV0dYLM&feature=related.
U.S. Appl. No. 12/366,593, filed Feb. 5, 2009, entitled "System and Method for Depth Perspective Image Rendering," Inventor(s): J. William Mauchly et al.
U.S. Appl. No. 12/727,089, filed Mar. 18, 2010, entitled "System and Method for Enhancing Video Images in a Conferencing Environment," Inventor: Joseph T. Friel.
U.S. Appl. No. 12/781,722, filed May 17, 2010, entitled "System and Method for Providing Retracting Optics in a Video Conferencing Environment," Inventor(s): Joseph T. Friel, et al.
U.S. Appl. No. 12/877,833, filed Sep. 8, 2010, entitled "System and Method for Skip Coding During Video Conferencing in a Network Environment," Inventor[s]: Dihong Tian, et al.
U.S. Appl. No. 12/870,687, filed Aug. 27, 2010, entitled "System and Method for Producing a Performance Via Video Conferencing in a Network Environment," Inventor(s): Michael A. Arnao et al.
U.S. Appl. No. 12/912,556, filed Oct. 26, 2010, entitled "System and Method for Provisioning Flows in a Mobile Network Environment," Inventors: Balaji Vankat Vankataswami, et al.
U.S. Appl. No. 12/949,614, filed Nov. 18, 2010, entitled "System and Method for Managing Optics in a Video Environment," Inventors: Torence Lu, et al.
U.S. Appl. No. 12/873,100, filed Aug. 31, 2010, entitled "System and Method for Providing Depth Adaptive Video Conferencing," Inventor(s): J. William Mauchly et al.
U.S. Appl. No. 12/946,679, filed Nov. 15, 2010, entitled "System and Method for Providing Camera Functions in a Video Environment," Inventors: Peter A.J. Fornell, et al.
U.S. Appl. No. 12/946,695, filed Nov. 15, 2010, entitled "System and Method for Providing Enhanced Audio in a Video Environment," Inventors: Wei Li, et al.
U.S. Appl. No. 12/907,914, filed Oct. 19, 2010, entitled "System and Method for Providing Videomail in a Network Environment," Inventors: David J. Mackie et al.
U.S. Appl. No. 12/950,786, filed Nov. 19, 2010, entitled "System and Method for Providing Enhanced Video Processing in a Network Environment," Inventor[s]: David J. Mackie.
U.S. Appl. No. 12/907,919, filed Oct. 19, 2010, entitled "System and Method for Providing Connectivity in a Network Environment," Inventors: David J. Mackie et al.
U.S. Appl. No. 12/946,704, filed Nov. 15, 2010, entitled "System and Method for Providing Enhanced Graphics in a Video Environment," Inventors: John M. Kanalakis, Jr., et al.
U.S. Appl. No. 12/957,116, filed Nov. 30, 2010, entitled "System and Method for Gesture Interface Control," Inventors: Shuan K. Kirby, et al.
U.S. Appl. No. 13/036,925, filed Feb. 28, 2011, entitled "System and Method for Selection of Video Data in a Video Conference Environment," Inventor(s) Sylvia Olayinka Aya Manfa N'guessan.
U.S. Appl. No. 12/907,925, filed Oct. 19, 2010, entitled "System and Method for Providing a Pairing Mechanism in a Video Environment," Inventors: Gangfeng Kong et al.
U.S. Appl. No. 12/939,037, filed Nov. 3, 2010, entitled "System and Method for Managing Flows in a Mobile Network Environment," Inventors: Balaji Venkat Venkataswami et al.
U.S. Appl. No. 13/096,772, filed Apr. 28, 2011, entitled "System and Method for Providing Enhanced Eye Gaze in a Video Conferencing Environment," Inventors: Charles C. Byers et al.
U.S. Appl. No. 12/946,709, filed Nov. 15, 2010, entitled "System and Method for Providing Enhanced Graphics in a Video Environment," Inventors: John M. Kanalakis, Jr., et al.
U.S. Appl. No. 13/096,795, filed Apr. 28, 2011, entitled "System and Method for Providing Enhanced Eye Gaze in a Video Conferencing Environment," Inventors: Charles C. Byers et al.
U.S. Appl. No. 12/784,257, filed May 20, 2010, entitled "Implementing Selective Image Enhancement," Inventors: Dihong Tian et al.
Design U.S. Appl. No. 29/375,624, filed Sep. 24, 2010, entitled "Mounted Video Unit," Inventor(s): Ashok T. Desai et al.
Design U.S. Appl. No. 29/375,627, filed Sep. 24, 2010, entitled "Mounted Video Unit," Inventor(s): Ashok T. Desai et al.
Design U.S. Appl. No. 29/375,619, filed Sep. 24, 2010, entitled "Free-Standing Video Unit," Inventor(s): Ashok T. Desai et al.
Design U.S. Appl. No. 29/389,651, filed Apr. 14, 2011, entitled "Video Unit With Integrated Features," Inventor(s): Kyle A. Buzzard et al.
Design U.S. Appl. No. 29/389,654, filed Apr. 14, 2011, entitled "Video Unit With Integrated Features," Inventor(s): Kyle A. Buzzard et al.
Design U.S. Appl. No. 29/381,245, filed Dec. 16, 2010, entitled "Interface Element," Inventor(s): John M. Kanalakis, Jr., et al.
Design U.S. Appl. No. 29/381,250, filed Dec. 16, 2010, entitled "Interface Element," Inventor(s): John M. Kanalakis, Jr., et al.
Design U.S. Appl. No. 29/381,254, filed Dec. 16, 2010, entitled "Interface Element," Inventor(s): John M. Kanalakis, Jr., et al.
Design U.S. Appl. No. 29/381,256, filed Dec. 16, 2010, entitled "Interface Element," Inventor(s): John M. Kanalakis, Jr., et al.
Design U.S. Appl. No. 29/381,259, filed Dec. 16, 2010, entitled "Interface Element," Inventor(s): John M. Kanalakis, Jr., et al.
Design U.S. Appl. No. 29/381,260, filed Dec. 16, 2010, entitled "Interface Element," Inventor(s): John M. Kanalakis, Jr., et al.
Design U.S. Appl. No. 29/381,262, filed Dec. 16, 2010, entitled "Interface Element," Inventor(s): John M. Kanalakis, Jr., et al.
Design U.S. Appl. No. 29/381,264 filed Dec. 16, 2010, entitled "Interface Element," Inventor(s): John M. Kanalakis, Jr., et al.
PCT "International Search Report and the Written Opinion of the International Searching Authority, or the Declaration," PCT/US2010/026456, dated Jun. 29, 2010; 11 pages.
PCT "Notification of Transmittal of the International Search Report and the Written Opinion of the International Searching Authority, or the Declaration," PCT/US2009/001070, dated Apr. 4, 2009; 14 pages.
PCT "Notification of Transmittal of the International Search Report and the Written Opinion of the International Searching Authority, or the Declaration," PCT/US2009/038310; dated Oct. 10, 2009; 17 pages.
PCT "International Preliminary Report on Patentability and Written Opinion of the International Searching Authority," PCT/US2009/038310; dated Sep. 28, 2010; 10 pages.

(56) References Cited

OTHER PUBLICATIONS

PCT "International Preliminary Report on Patentability dated Sep. 29, 2009, International Search Report, and Written Opinion," for PCT International Application PCT/US2008/058079; dated Sep. 18, 2008, 10 pages.
"3D Particles Experiments in AS3 and Flash CS3," [retrieved and printed on Mar. 18, 2010]; 2 pages; http://www.flashandmath.com/advanced/fourparticles/notes.html.
3G, "World's First 3G Video Conference Service with New TV Commercial," Apr. 28, 2005, 4 pages; http://www.3g.co.uk/PR/April2005/1383.htm.
Digital Video Enterprises, "DVE Eye Contact Silhouette," 1 page, © DVE 2008; http://www.dvetelepresence.com/products/eyeContactSilhouette.asp.
France Telecom R&D, "France Telecom's Magic Telepresence Wall—Human Productivity Lab," 5 pages, retrieved and printed on May 17, 2010; http://www.humanproductivitylab.com/archive_blogs/2006/07/11/france_telecoms_magic_telepres_1.php.
Joshua Gluckman and S.K. Nayar, "Rectified Catadioptric Stereo Sensors," 8 pages, retrieved and printed on May 17, 2010; http://cis.poly.edu/~gluckman/papers/cvpr00.pdf.
R.V. Kollarits, et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.
Trevor Darrell, "A Real-Time Virtual Mirror Display," 1 page, Sep. 9, 1998; http://people.csail.mit.edu/trevor/papers/1998-021/node6.html.
Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.
Active8-3D—Holographic Projection—3D Hologram Retail Display & Video Project, [retrieved and printed on Feb. 24, 2009], http://www.activ8-3d.co.uk/3d_holocubes; 1 page.
Andersson, L., et al., "LDP Specification," Network Working Group, RFC 3036, Jan. 2001, 133 pages; http://tools.ietf.org/html/rfc3036.
Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.
Arrington, Michael, "eJamming—Distributed Jamming," TechCrunch; Mar. 16, 2006; http://www.techcrunch.com/2006/03/16/ejamming-distributed-jamming/; 1 page.
Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages; http://www.cs.ubc.cat/~murphyk/Software/Kalman/ParticleFilterTutorial.pdf.
Avrithis, Y., et al., "Color-Based Retrieval of Facial Images," European Signal Processing Conference (EUSIPCO '00), Tampere, Finland; Sep. 2000; http://www.image.ece.ntua.gr/~ntsap/presentations/eusipco00.ppt#256; 18 pages.
Awduche, D., et al., "Requirements for Traffic Engineering over MPLS," Network Working Group, RFC 2702, Sep. 1999, 30 pages; http://tools.ietf.org/pdf/rfc2702.pdf.
Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.
Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.
Berzin, O., et al., "Mobility Support Using MPLS and MP-BGP Signaling," Network Working Group, Apr. 28, 2008, 60 pages; http://www.potaroo.net/ietf/all-/draft-berzin-malis-mpls-mobility-01.txt.

Boccaccio, Jeff; CEPro, "Inside HDMI CEC: The Little-Known Control Feature," Dec. 28, 2007; http://www.cepro.com/article/print/inside_hdmi_cec_the_little_known_control_feature; 2 pages.
Boros, S., "Policy-Based Network Management with SNMP," Proceedings of the EUNICE 2000 Summer School Sep. 13-15, 2000, p. 3.
Chan, Eric, et al., "Experiments on block-matching techniques for video coding," Multimedia Systems; 9 Springer-Verlag 1994, Multimedia Systems (1994) 2 pp. 228-241.
Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.
Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-bluetooth; 1 page.
Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.
Chien et al., "Efficient moving Object Segmentation Algorithm Using Background Registration Technique," IEEE Transactions on Circuits and Systems for Video Technology, vol. 12, No. 7, Jul. 2002, 10 pages.
Cisco: Bill Mauchly and Mod Marathe; UNC: Henry Fuchs, et al., "Depth-Dependent Perspective Rendering," Apr. 15, 2008; 6 pages.
Costa, Cristina, et al., "Quality Evaluation and Nonuniform Compression of Geometrically Distorted Images Using the Quadtree Distorion Map," EURASIP Journal on Applied Signal Processing, Jan. 7, 2004, vol. 2004, No. 12; © 2004 Hindawi Publishing Corp.; XP002536356; ISSN: 1110-8657; pp. 1899-1911; http://downloads.hindawi.com/journals/asp/2004/470826.pdf.
Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.
Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.
Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; ISBN: 978-0-8186-8821-8; XP010586786; pp. 443-447.
Diaz, Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.
Diaz, Jesus, iPhone Bluetooth File Transfer Coming Soon (YES!); Jan. 26, 2009; http://i.gizmodo.com/5138797/iphone-bluetooth-file-transfer-coming-soon-yes; 1page.
Dornaika F., et al., "Head and Facial Animation Tracking Using Appearance-Adaptive Models and Particle Filters," Jun. 27, 2004, 22 pages; Heudiasy Research Lab, http://eprints.pascal-network.org/archive/00001231/01/rtvhci_chapter8.pdf.
DVE Digital Video Enterprises, "DVE Tele-Immersion Room," [retrieved and printed on Feb. 5, 2009] http://www.dvetelepresence.com/products/immersion_room.asp; 2 pages.
Dynamic Displays, copyright 2005-2008 [retrieved and printed on Feb. 24, 2009] http://www.zebraimaging.com/html/lighting_display.html, 2 pages.

(56) References Cited

OTHER PUBLICATIONS

ECmag.com, "IBS Products," Published Apr. 2009; http://www.ecmag.com/index.cfm?fa=article&articleID=10065; 2 pages.
Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.
EJamming Audio, Learn More; [retrieved and printed on May 27, 2010] http://www.ejamming.com/learnmore/; 4 pages.
Electrophysics Glossary, "Infrared Cameras, Thermal Imaging, Night Vision, Roof Moisture Detection," [retrieved and printed on Mar. 18, 2010] http://www.electrophysics.com/Browse/Brw_Glossary.asp; 11 pages.
Farrukh, A., et al., Automated Segmentation of Skin-Tone Regions in Video Sequences, Proceedings IEEE Students Conference, ISCON_apos_02; Aug. 16-17, 2002; pp. 122-128.
Fiala, Mark, "Automatic Projector Calibration Using Self-Identifying Patterns," National Research Council of Canada, Jun. 20-26, 2005; http://www.procams.org/procams2005/papers/procams05-36.pdf; 6 pages.
Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.
Freeman, Professor Wilson T., Computer Vision Lecture Slides, "6.869 Advances in Computer Vision: Learning and Interfaces," Spring 2005; 21 pages.
Garg, Ashutosh, et al., "Audio-Visual ISpeaker Detection Using Dynamic Bayesian Networks," IEEE International Conference on Automatic Face and Gesture Recognition, 2000 Proceedings, 7 pages; http://www.ifp.illinois.edu/~ashutosh/papers/FG00.pdf.
Gemmell, Jim, et al., "Gaze Awareness for Video-conferencing: A Software Approach," IEEE MultiMedia, Oct.-Dec. 2000; vol. 7, No. 4, pp. 26-35.
Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.
Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.becst08/docs/cp/Plenary/P.1.pdf; 6 pages.
Gries, Dan, "3D Particles Experiments in AS3 and Flash CS3, Dan's Comments," [retrieved and printed on May 24, 2010] http://www.flashandmath.com/advanced/fourparticles/notes.html; 3 pages.
Guernsey, Lisa, "Toward Better Communication Across the Language Barrier," Jul. 29, 1999; http://www.nytimes.com/1999/07/29/technology/toward-better-communication-across-the-language-barrier.html; 2 pages.
Guili, D., et al., "Orchestra!: A Distributed Platform for Virtual Musical Groups and Music Distance Learning over the Internet in JavaTM Technology" ; [retrieved and printed on Jun. 6, 2010] http://ieeexplore.ieee.org/stamp/stamp.jsp?tp=&arnumber=778626; 2 pages.
Gundavelli, S., et al., "Proxy Mobile IPv6," Network Working Group, RFC 5213, Aug. 2008, 93 pages; http://tools.ietf.org/pdf/rfc5213.pdf.
Gussenhoven, Carlos, "Chapter 5 Transcription of Dutch Intonation," Nov. 9, 2003, 33 pages; http://www.ru.nl/publish/pages/516003/todisun-ah.pdf.
Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.
Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; XP011115755; pp. 1086-1097.
Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.
He, L., et al., "The Virtual Cinematographer: A Paradigm for Automatic Real-Time Camera Control and Directing," Proc. SIGGRAPH, © 1996; http://research.microsoft.com/en-us/um/people/lhe/papers/siggraph96.vc.pdf; 8 pages.
Hepper, D., "Efficiency Analysis and Application of Uncovered Background Prediction in a Low BitRate Image Coder," IEEE Transactions on Communications, vol. 38, No. 9, pp. 1578-1584, Sep. 1990.
Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.
Holographic Imaging, "Dynamic Holography for scientific uses, military heads up display and even someday HoloTV Using TI's DMD," [retrieved and printed on Feb. 26, 2009] http://innovation.swmed.edu/ research/instrumentation/res_inst_dev3d.html; 5 pages.
Hornbeck, Larry J., "Digital Light ProcessingTM: A New MEMS-Based Display Technology," [retrieved and printed on Feb. 26, 2009] http://focus.ti.com/pdfs/dlpdmd/17_Digital_Light_Processing_MEMS_display_technology.pdf; 22 pages.
IR Distribution Category @ Envious Technology, "IR Distribution Category," [retrieved and printed on Apr. 22, 2009] http://www.envioustechnology.com.au/ products/product-list.php?CID=305; 2 pages.
IR Trans—Products and Orders—Ethernet Devices, [retrieved and printed on Apr. 22, 2009] http://www.irtrans.de/en/shop/lan.php; 2 pages.
Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.
Itoh, Hiroyasu, et al., "Use of a gain modulating framing camera for time-resolved imaging of cellular phenomena," SPIE vol. 2979, 1997, pp. 733-740.
Jamoussi, Bamil, "Constraint-Based LSP Setup Using LDP," MPLS Working Group, Sep. 1999, 34 pages; http://tools.ietf.org/html/draft-ietf-mpls-cr-ldp-03.
Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.
Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.
Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.
Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.
Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.
Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.
Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.
Keijser, Jeroen, et al., "Exploring 3D Interaction in Alternate Control-Display Space Mappings," IEEE Symposium on 3D User Interfaces, Mar. 10-11, 2007, pp. 17-24.
Kim, Y.H., et al., "Adaptive mode decision for H.264 encoder," Electronics letters, vol. 40, Issue 19, pp. 1172-1173, Sep. 2004; 2 pages.

(56) References Cited

OTHER PUBLICATIONS

Klint, Josh, "Deferred Rendering in Leadwerks Engine," Copyright Leadwerks Corporation © 2008; http://www.leadwerks.com/files/Deferred_Rendering_in_Leadwerks_Engine.pdf; 10 pages.
Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages; http://fulfillment.umi.com/dissertations/b7afbcb56ba72fdb14d26dfccc6b470f/1291487062/3143800.pdf.
Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.
Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].
Lambert, "Polycom Video Communications," © 2004 Polycom, Inc., Jun. 20, 2004 http://www.polycom.com/global/documents/whitepapers/video_communications_h.239_people_content_polycom_patented_technology.pdf.
Lawson, S., "Cisco Plans TelePresence Translation Next Year," Dec. 9, 2008; http://www.pcworld.com/article/155237/.html?tk=rss_news; 2 pages.
Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/Ijy_ICME2004.pdf; 4 pages.
Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.
Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.
Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.
Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/O/3ZuQHYNlcrI.
Miller, Gregor, et al., "Interactive Free-Viewpoint Video," Centre for Vision, Speech and Signal Processing, [retrieved and printed on Feb. 26, 2009], http://www.ee.surrey.ac.uk/CVSSP/VMRG/ Publications/miller05cvmp.pdf, 10 pages.
Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.
Minoru from Novo is the worlds first consumer 3D Webcam, Dec. 11, 2008; http://www.minoru3d.com; 4 pages.
Mitsubishi Electric Research Laboratories, copyright 2009 [retrieved and printed on Feb. 26, 2009], http://www.merl.com/projects/3dtv, 2 pages.
Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.
National Training Systems Association Home—Main, Interservice/Industry Training, Simulation & Education Conference, Dec. 1-4, 2008; http://ntsa.metapress.com/app/home/main.asp?referrer=default; 1 page.
Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.
Opera Over Cisco TelePresence at Cisco Expo 2009, in Hannover Germany—Apr. 28, 29, posted on YouTube on May 5, 2009; http://www.youtube.com/watch?v=xN5jNH5E-38; 1 page.
OptoIQ, "Vision+Automation Products—VideometerLab 2," [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages.
OptoIQ, "Anti-Speckle Techniques Uses Dynamic Optics," Jun. 1, 2009; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnlOptoLFWJanuary132010.html; 2 pages.
OptoIQ, "Smart Camera Supports Multiple Interfaces," Jan. 22, 2009; http://www.optoiq.com/index/machine-vision-imaging-processing/display/vsd-article-display/350639/articles/vision-systems-design/daily-product-2/2009/01/smart-camera-supports-multiple-interfaces.html; 2 pages.
OptoIQ, "Vision Systems Design—Machine Vision and Image Processing Technology," [retrieved and printed on Mar. 18, 2010], http://www.optoiq.com/index/machine-vision-imaging-processing.html; 2 pages.
Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.
Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.
EPO Feb. 25, 2011 Communication for EP09725288.6 (published as EP22777308); 4 pages.
EPO Aug. 15, 2011 Response to EPO Communication mailed Feb. 25, 2011 from European Patent Application No. 09725288.6; 15 pages.
EPO Nov. 3, 2011 Communication from European Application EP10710949.8; 2 pages.
EPO Mar. 12, 2012 Response to EP Communication dated Nov. 3, 2011 from European Application EP10710949.8; 15 pages.
EPO Mar. 20, 2012 Communication from European Application 09725288.6; 6 pages.
EPO Jul. 10, 2012 Response to EP Communication from European Application EP10723445.2.
EPO Sep. 24, 2012 Response to Mar. 20, 2012 EP Communication from European Application EP09725288.6.
PCT Aug. 26, 2010 International Preliminary Report on Patentability mailed Aug. 26, 2010 for PCT/US2009/001070; 10 pages.
PCT Oct. 12, 2011 International Search Report and Written Opinion of the ISA from PCT/US2011/050380.
PCT Nov. 24, 2011 International Preliminary Report on Patentability from International Application Serial No. PCT/US2010/033880; 6 pages.
PCT Aug. 23, 2011 International Preliminary Report on Patentability and Written Opinion of the ISA from PCT/US2010/024059; 6 pages.
PCT Sep. 13, 2011 International Preliminary Report on Patentability and the Written Opinion of the ISA from PCT/US2010/026456; 5 pages.
PCT Jan. 23, 2012 International Search Report and Written Opinion of the ISA from International Application Serial No. PCT/US2011/060579; 10 pages.

(56) References Cited

OTHER PUBLICATIONS

PCT Jan. 23, 2012 International Search Report and Written Opinion of the ISA from International Application Serial No. PCT/US2011/060584; 11 pages.
PCT Feb. 20, 2012 International Search Report and Written Opinion of the ISA from International Application Serial No. PCT/US2011/061442; 12 pages.
PCT Mar. 21, 2013 International Preliminary Report on Patentability from International Application Serial No. PCT/US2011/050380.
Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.
Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.
Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.
Radhika, N., et al., "Mobile Dynamic reconfigurable Context aware middleware for Adhoc smart spaces," Academic Open Internet Journal, ISSN 1311-4360, vol. 22, 2008; 3 pages http://www.acadjournal.com/2008/V22/part6/p7.
Rayvel Business-to-Business Products, copyright 2004 [retrieved and printed on Feb. 24, 2009], http://www.rayvel.com/b2b.html; 2 pages.
Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf; 6 pages.
Rikert, T.D., et al., "Gaze Estimation using Morphable models," IEEE International Conference on Automatic Face and Gesture Recognition, Apr. 1998; 7 pgs http://citeseer.ist.psu.edu/viewdoc/summary?doi=10.1.1.30.9472.
Butler, Darren, et al., "Robust Face Localisation Using Motion, Colour & Fusion"; Proc. VIIth Digital Image Computing: Techniques and Applications, Sun C. et al (Eds.), Sydney; XP007905630; pp. 899-908; Dec. 10, 2003; http://www.cmis.csiro.au/Hugues.Talbot/dicta2003/cdrom/pdf/0899.pdf.
Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.
School of Computing, "Bluetooth over IP for Mobile Phones," 2005; http://www.computing.dcu.ie/wwwadmin/fyp-abstract/list/fyp_details05.jsp?year=2005&number=51470574; 1 page.
Sena, "Industrial Bluetooth," [retrieved and printed on Apr. 22, 2009] http://www.sena.com/products/industrial_bluetooth; 1 page.
Shaffer, Shmuel, "Translation—State of the Art" presentation; Jan. 15, 2009; 22 pages.
Shi, C. et al., "Automatic Image Quality Improvement for Videoconferencing," IEEE ICASSP May 2004; http://research.microsoft.com/pubs/69079/0300701.pdf; 4 pages.
Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.
Smarthome, "IR Extender Expands Your IR Capabilities," [retrieved and printed on Apr. 22, 2009], http://www.smarthome.com/8121.html; 3 pages.
Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.
Sonoma Wireworks Forums, "Jammin on Rifflink," [retrieved and printed on May 27, 2010] http://www.sonomawireworks.com/forums/viewtopic.php?id=2659; 5 pages.

Sonoma Wireworks Rifflink, [retrieved and printed on Jun. 2, 2010] http://www.sonomawireworks.com/rifflink.php; 3 pages.
Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE—Int. Soc. Opt. Eng USA ISSN: 0277-786X; XP007905596; pp. 78-88.
Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.
Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.
Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.
Super Home Inspectors or Super Inspectors, [retrieved and printed on Mar. 18, 2010] http://www.umrt.com/PageManager/Default.aspx/PageID=2120325; 3 pages.
Tan, Kar-Han, et al., "Appearance-Based Eye Gaze Estimation," in Proceedings IEEE WACV'02, 2002, 5 pages; http://citeseer.ist.psu.edu/viewdoc/summary?doi=10.1.1.19.8921.
Total immersion, Video Gallery, copyright 2008-2009 [retrieved and printed on Feb. 26, 2009], http://www.t-immersion.com/en,video-gallery,36.html, 1 page.
Trucco, E., et al., "Real-Time Disparity Maps for Immersive 3-D Teleconferencing by Hybrid Recursive Matching and Census Transform," [retrieved and printed on May 4, 2010] http://server.cs.ucf.edu/~vision/papers/VidReg-final.pdf; 9 pages.
Tsapatsoulis, N., et al., "Face Detection for Multimedia Applications," Proceedings of the ICIP Sep. 10-13 2000, Vancouver, BC, Canada; vol. 2, pp. 247-250.
Tsapatsoulis, N., et al., "Face Detection in Color Images and Video Sequences," 10th Mediterranean Electrotechnical Conference (MELECON), May 29-31, 2000; vol. 2; pp. 498-502.
Veratech Corp., "Phantom Sentinel," © VeratechAero 2006, 1 page; http://www.veratechcorp.com/phantom.html.
Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.
Wachs, J., et al., "A Real-time Hand Gesture System Based on Evolutionary Search," Vision, 3$^{rd}$ Quarter 2006, vol. 22, No. 3, 18 pages; http://web.ics.purdue.edu/~jpwachs/papers/3q06vi.pdf.
Wang, Hualu, et al., "A Highly Efficient System for Automatic Face Region Detection inMPEG Video," IEEE Transactions on Circuits and Systems for Video Technology; vol. 7, Issue 4; 1977 pp. 615-628.
Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.
Wang, Robert and Jovan Popovic, "Desktop virtual reality," video clip, YouTube, posted by rkeltset on Apr. 8, 2010, 1 page; http://www.youtube.com/watch?v=9rBtm62Lkfk.
Wang, Robert and Jovan Popovic, "Gestural user input," video clip, YouTube, posted by rkeltset on May 19, 2010, 1 page; http://www.youtube.com/watch?v=3JWYTtBjdTE.
Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.
Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.
Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu./rywang/handtracking/s09-hand-tracking.pdf.

(56) References Cited

OTHER PUBLICATIONS

Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwJkWP6Sw.

Weinstein et al., "Emerging Technologies for Teleconferencing and Telepresence," Wainhouse Research 2005; http://www.ivci.com/pdf/whitepaper-emerging-technologies-for-teleconferencing-and-telepresence.pdf.

Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.

Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.

Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.

Wi-Fi Protected Setup, from Wikipedia, Sep. 2, 2010, 3 pages http://en.wikipedia.org/wiki/Wi-Fi_Protected_Setup.

Wilson, Mark, "Dreamoc 3D Display Turns Any Phone Into Hologram Machine," Oct. 30, 2008; http://gizmodo.com/5070906/dreamoc-3d-display-turns-any-phone-into-hologram-machine; 2 pages.

WirelessDevNet, Melody Launches Bluetooth Over IP, [retrieved and printed on Jun. 5, 2010] http://www.wirelessdevnet.com/news/2001/155/news5.html; 2 pages.

Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.

Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.

Yang, Jie, et al., "A Real-Time Face Tracker," Proceedings 3rd IEEE Workshop on Applications of Computer Vision; 1996; Dec. 2-4, 1996; pp. 142-147; http://www.ri.cmu.edu/pub_files/pub1/yang_jie_1996_1/yang_jie_1996_1.pdf.

Yang, Ming-Hsuan, et al., "Detecting Faces in Images: A Survey," vol. 24, No. 1; Jan. 2002; pp. 34-58; http://vision.ai.uiuc.edu/mhyang/papers/pami02a.pdf.

Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf; 10 pages.

Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.

Yegani, P. et al., "GRE Key Extension for Mobile IPv4," Network Working Group, Feb. 2006, 11 pages; http://tools.ietf.org/pdf/draft-yegani-gre-key-extension-01.pdf.

Yoo, Byounghun, et al., "Image-Based Modeling of Urban Buildings Using Aerial Photographs and Digital Maps," Transactions in GIS, 2006, 10(3): p. 377-394.

Zhong, Ren, et al., "Integration of Mobile IP and MPLS," Network Working Group, Jul. 2000, 15 pages; http://tools.ietf.org/html/draft-zhong-mobile-ip-mpls-01.

PRC Aug. 3, 2012 SIPO First Office Action from Chinese Application No. 200980119121.5; 16 pages.

PRC Dec. 18, 2012 Response to SIPO First Office Action from Chinese Application No. 200980119121.5; 16 pages.

PRC Jan. 7, 2013 SIPO Second Office Action from Chinese Application Serial No. 200980105262.1.

"Oblong Industries is the developer of the g-speak spatial operation environment," Oblong Industries Information Page, 2 pages, [Retrieved and printed on Dec. 1, 2010] http://oblong.com.

Underkoffler, John, "G-Speak Overview 1828121108," video clip, Vimeo.com, 1 page, [Retrieved and printed on Dec. 1, 2010] http://vimeo.com/2229299.

Kramer, Kwindla, "Mary Ann de Lares Norris at Thinking Digital," Oblong Industries, Inc. Web Log, Aug. 24, 2010; 1 page; http://oblong.com/articles/OBS6hEeJmoHoCwgJ.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/OB22LFIS1NVyrOmR.html.

"John Underkoffler points to the future of UI," video clip and interactive transcript, Video on TED.com, Jun. 2010, 6 pages; http://www.ted.com/talks/john_underkoffler_drive_3d_data_with_a_gesture.html.

Kramer, Kwindla, "Oblong on Bloomberg TV," Oblong Industries, Inc. Web Log, Jan. 28, 2010, 1 page; http://oblong.com/article/0AN_1KD9q990PEnw.html.

Kramer, Kwindla, "g-speak at RISD, Fall 2009," Oblong Industries, Inc. Web Log, Oct. 29, 2009, 1 page; http://oblong.com/article/09uW060q6xRIZYvm.html.

Kramer, Kwindla, "g-speak + TMG," Oblong Industries, Inc. Web Log, Mar. 24, 2009, 1 page; http://oblong.com/article/08mM77zpYMm7kFtv.html.

"g-stalt version 1," video clip, YouTube.com, posted by zigg1es on Mar. 15, 2009, 1 page; http://youtube.com/watch?v=k8ZAql4mdvk.

Underkoffler, John, "Carlton Sparrell speaks at MIT," Oblong Industries, Inc. Web Log, Oct. 30, 2009, 1 page; http://oblong.com/article/09usAB4I1Ukb6CPw.html.

Underkoffler, John, "Carlton Sparrell at MIT Media Lab," video clip, Vimeo.com, 1 page, [Retrieved and printed Dec. 1, 2010] http://vimeo.com/7355992.

Underkoffler, John, "Oblong at Altitude: Sundance 2009," Oblong Industries, Inc. Web Log, Jan. 20, 2009, 1 page; http://oblong.com/article/08Sr62ron_2akg0D.html.

Underkoffler, John, "Oblong's tamper system 1801011309," video clip, Vimeo.com, 1 page, [Retrieved and printed Dec. 1, 2010] http://vimeo.com/2821182.

Feld, Brad, "Science Fact," Oblong Industries, Inc. Web Log, Nov. 13, 2008, 2 pages,http://oblong.com/article/084H-PKI5Tb9I4Ti.html.

Kwindla Kramer, "g-speak in slices," Oblong Industries, Inc. Web Log, Nov. 13, 2008, 6 pages; http://oblong.com/article/0866JqfNrFg1NeuK.html.

Underkoffler, John, "Origins: arriving here," Oblong Industries, Inc. Web Log, Nov. 13, 2008, 5 pages; http://oblong.com/article/085zBpRSY9JeLv2z.html.

Rishel, Christian, "Commercial overview: Platform and Products," Oblong Industries, Inc., Nov. 13, 2008, 3 pages; http://oblong.com/article/086E19gPvDcktAf9.html.

U.S. Appl. No. 14/055,427, filed Oct. 16, 2013, entitled "System and Method for Provisioning Flows in a Mobile Network Environment," Inventors: Balaji Vankat Vankataswami, et al.

U.S. Appl. No. 14/154,608, filed Jan. 14, 2014, entitled "System and Method for Extending Communications Between Participants in a Conferencing Environment," Inventors: Brian Baldino, et al.

PRC Aug. 28, 2013 SIPO First Office Action from Chineses Application No. 201080010988.X 7 pages.

PRC Nov. 26, 2013 SIPO First Office Action from Chinese Application No. 201080020670 5pgs.

Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

(56) References Cited

OTHER PUBLICATIONS

Schroeder, Erica, "The Next Top Model—Collaboration," Collaboration, The Workspace: A New World of Communications and Collaboration, Mar. 9, 2009; [Retrieved and printed Sep. 17, 2013] http//blogs.cisco.com/collaboration/the_next_top_model; 1 page.
PCT Mar. 30, 2013 International Preliminary Report on Patentability and Written Opinion from the International Searching Authority for International Application Serial No. PCT/US2011/061442 8 pages.
PCT Mar. 30, 2013 International Preliminary Report on Patentability and Written Opinion from the International Searching Authority for International Application Serial No. PCT/US2011/060579 6 pages.
PCT Mar. 30, 2013 International Preliminary Report on Patentability and Written Opinion from the International Searching Authority for International Application Serial No. PCT/US2011/060584 7 pages.
PRC Apr. 3, 2013 SIPO Second Office Action from Chinese Application No. 200980119121.5; 16 pages.
PRC Jun. 18, 2013 Response to SIPO Second Office Action from Chinese Application No. 200980119121.5; 5 pages.
PRC Jul. 9, 2013 SIPO Third Office Action from Chinese Application No. 200980119121.5; 15 pages.
PRC Sep. 24, 2013 Response to SIPO Third Office Action from Chinese Application No. 200980119121.5; 5 pages.

\* cited by examiner

SYSTEM AND METHOD FOR TRANSFERRING TRANSPARENCY INFORMATION IN A VIDEO ENVIRONMENT

TECHNICAL FIELD

This disclosure relates in general to the field of communications and, more particularly, to a system and a method for transferring transparency information in a video environment.

BACKGROUND

Video services have become increasingly important in today's society. In certain architectures, service providers may seek to offer sophisticated video conferencing services for their end users. The video conferencing architecture can offer an "in-person" meeting experience over a network. Video conferencing architectures can deliver real-time, face-to-face interactions between people using advanced visual, audio, and collaboration technologies. The ability to optimize video communications provides a significant challenge to system designers, device manufacturers, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS OVERVIEW

A method is provided in one example and includes receiving overlay data at a dual frame buffer module, which interacts with a video data buffer and an alpha data buffer. The method can also include storing the overlay data as a first video data in the video data buffer if an indicator is not present in the overlay data; and storing the overlay data as a second video data in the alpha data buffer if the indicator is present.

In more specific implementations, the indicator is a pixel in a non-viewable area of the overlay data. The indicator is identified as present if the pixel in the non-viewable area of the overlay data is from a group consisting of black, red, green, and blue. In other instances, the indicator is identified as present if pixel 0,0 of the overlay data is black and the indicator is not present if pixel 0,0 of the overlay data is not all black. In more specific implementations, the dual frame buffer module contains more than two ranks in each buffer.

In other examples, the method can include receiving third video data at a mixer; receiving the first video data at the mixer; receiving the second video data at the mixer; and combining the first video data, the second video data, and the third to produce a high-definition multimedia interface (HDMI) output, where the first video data and the second video data are combined such that a pixel transparency value in the second video data is applied to each corresponding pixel in the first video data.

Example Embodiments

Figure 1:
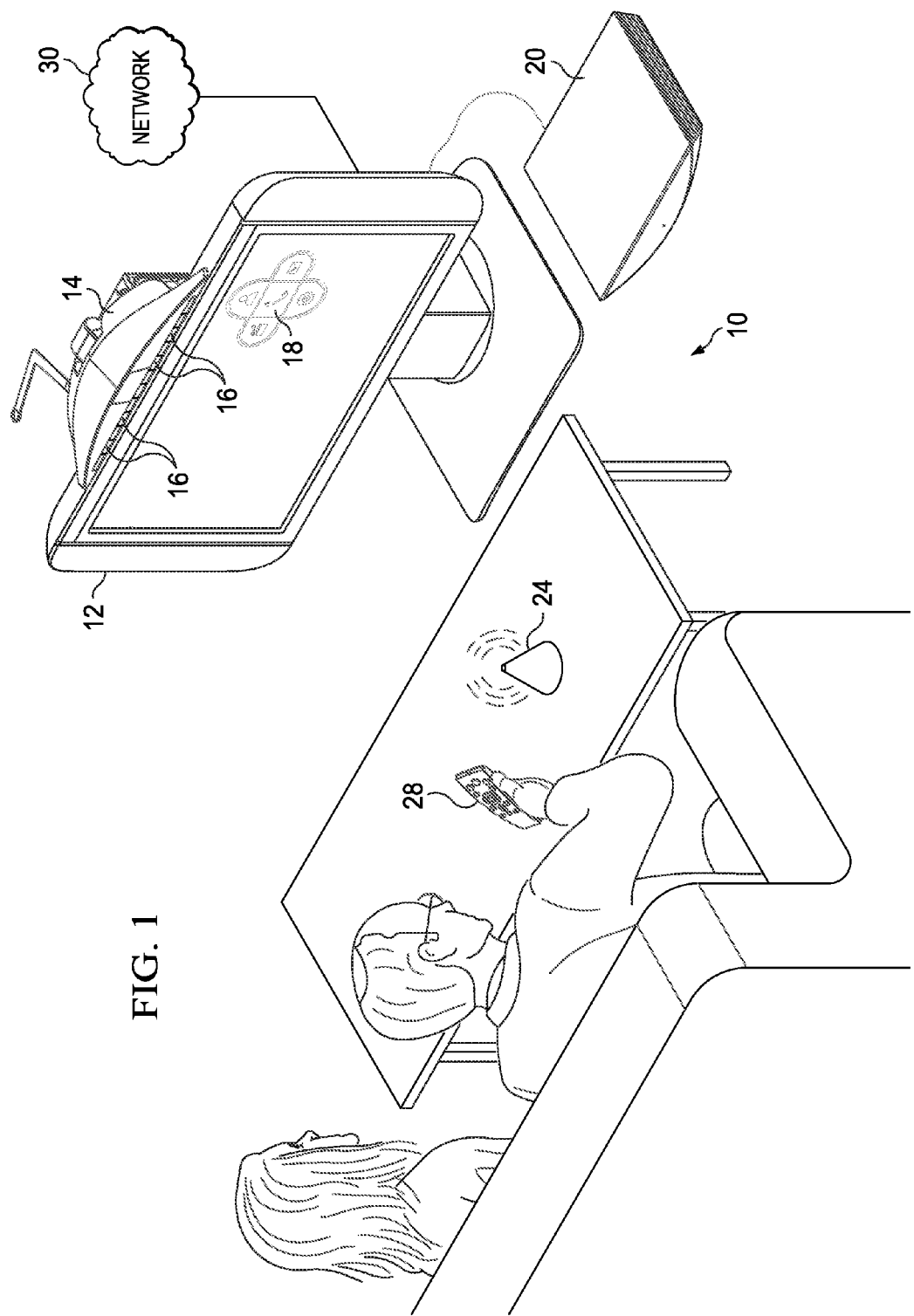
FIG. 1 is a simplified block diagram of a system for providing a video session in a network environment in accordance with one embodiment of the present disclosure.

Turning to FIG. 1, FIG. 1 is a simplified block diagram of a system 10 for providing a video session in a network environment. In this particular example, system 10 may include a display 12, a camera element 14, a user interface (UI) 18, a console element 20, a handset 28, and a network 30. A series of speakers 16 are provisioned in conjunction with camera element 14 in order to transmit and receive audio data. In one particular example implementation, a wireless microphone 24 is provided in order to receive audio data in a surrounding environment (e.g., from one or more audience members). Note that this wireless microphone 24 is purely optional, as speakers 16 are capable of sufficiently capturing audio data in a surrounding environment during any number of videoconferencing applications (which are detailed below).

In general terms, system 10 can be configured to capture video image data and/or audio data in the context of videoconferencing. System 10 may include a configuration capable of transmission control protocol/internet protocol (TCP/IP) communications for the transmission and/or reception of packets in a network. System 10 may also operate in conjunction with a user datagram protocol/IP (UDP/IP) or any other suitable protocol, where appropriate and based on particular communication needs.

Figure 2A:
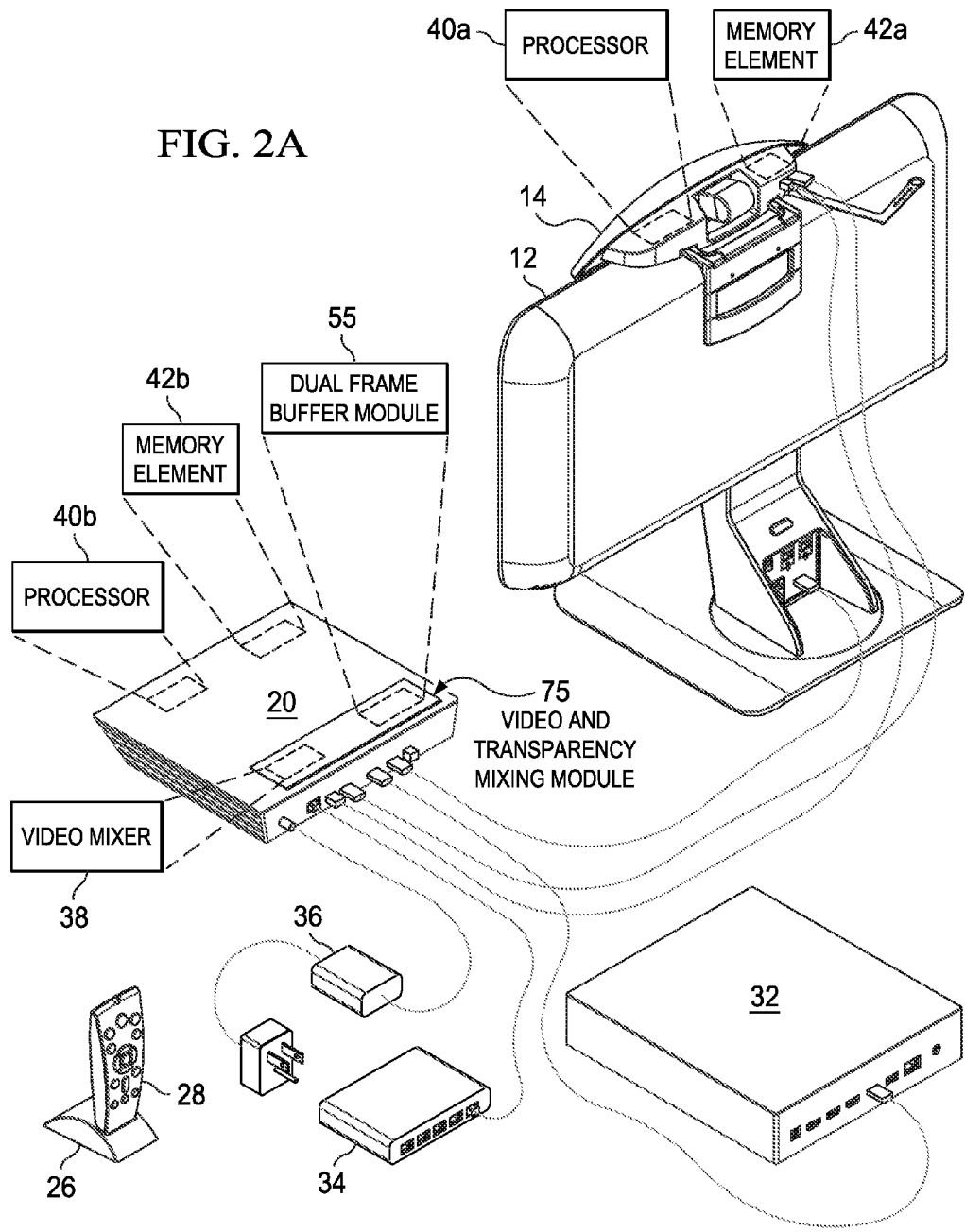
FIG. 2A is a simplified block diagram illustrating one example implementation of certain components associated with the system.

Turning to FIG. 2A, FIG. 2A is a simplified block diagram illustrating one possible set of details associated with system 10. FIG. 2A includes console element 20. Console element 20 includes a respective processor 40b, a respective memory element 42b, and a video and transparency mixing module 75. Video and transparency mixing module 75 contains a first video input and a second video input (shown in FIG. 2B). The first video input is configured to receive overlay data (e.g., overlay data may include video data and transparency data for the video data). The second video input is configured to receive video data. In a particular embodiment, video and transparency mixing module 75 combines the first video input with the second video input to produce an HDMI video output that contains transparency information. In another particular embodiment, multiple input video streams are received and transparency levels are assigned for each input pixel of each input stream such that each input stream may have a unique set of transparency levels.

Video and transparency mixing module 75 includes a video mixer 38, and a dual frame buffer module 55. Dual frame buffer module 55 is configured to read the overlay data received at the first video input and, if a condition is satisfied, write the overlay data to an alpha buffer. (The data in the alpha buffer can be transparency information for video data.) Alternatively, if the condition is not satisfied, then the data can be written to a video data buffer. (The data in the video data buffer can be the video data to which the transparency information will be applied.)

Figure 2B:
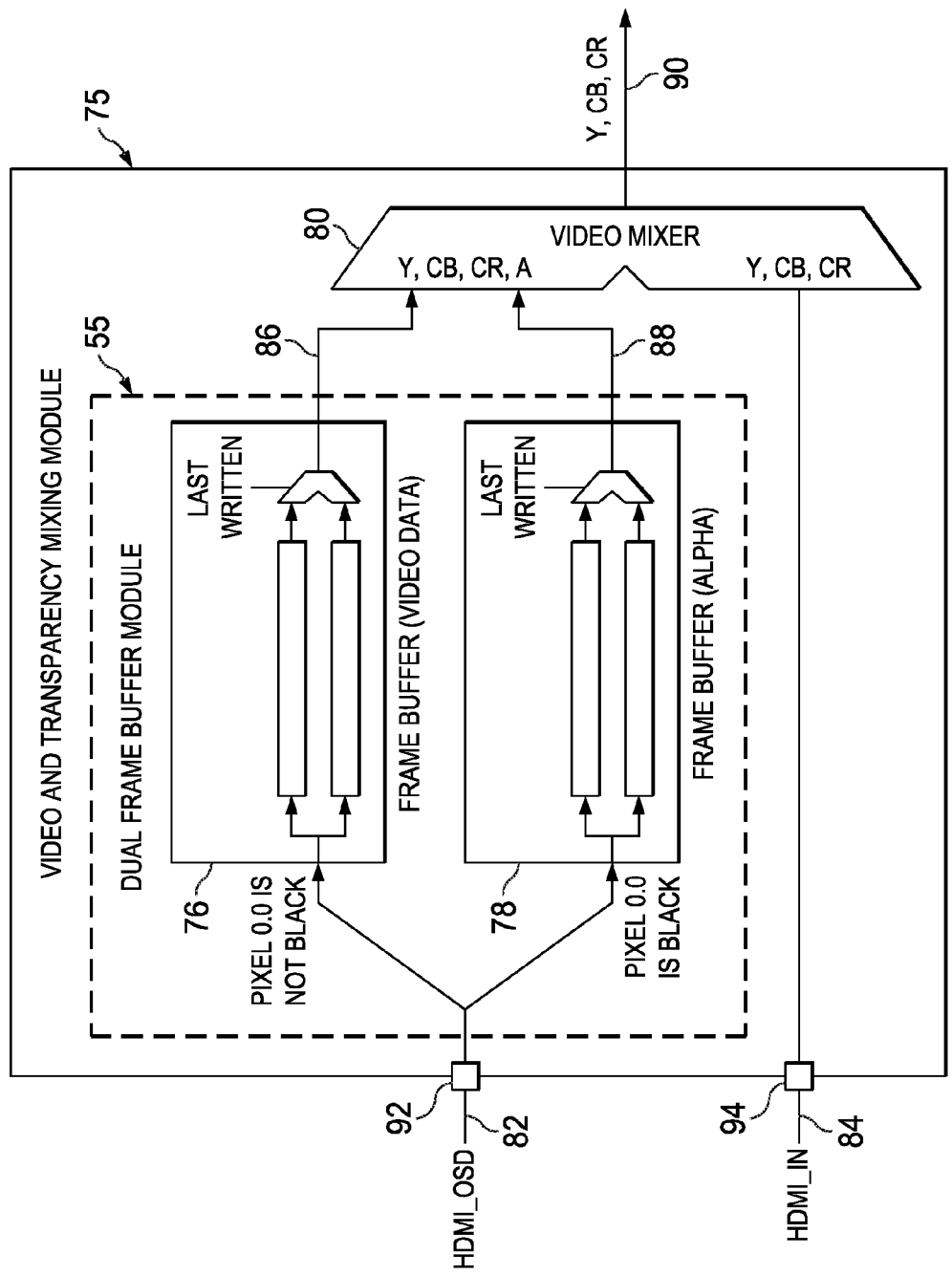
FIG. 2B is a simplified block diagram illustrating additional details of one example implementation of certain components associated with the system.

Dual frame buffer module 55 can be configured to transmit the last written data in the alpha buffer and the last written data in the video data buffer to video mixer 38. Video mixer 38 can be configured to combine the output of dual frame buffer module 55 with the video data received at the second input to create an HDMI video output that contains transparency information. [Note that dual frame buffer module 55 and video mixer 38 are illustrated in FIG. 2B and are detailed below.]

FIG. 2A further includes camera element 14. Camera element 14 includes a respective processor 40a and a respective memory element 42a. Camera element 14 can be coupled to console element 20. A power cord 36 is provided between an outlet and console element 20. Any suitable connections (wired or wireless) can be used in order to connect any of the components of FIG. 2A. In certain examples, the cables used may include Ethernet cables, HDMI cables, universal serial bus (USB) cables, or any other suitable link configured for carrying data or energy between two devices.

Before turning to additional discussions associated with the present disclosure, a brief overview is provided for explaining certain restraints associated with typical video systems. HDMI allows for the transmission of active video data, but it does not provide for the transmission of transparency information (commonly referred to as the alpha channel), along with that video data. When a system with multiple HDMI inputs seeks to mix those HDMI inputs, transparency levels should be provisioned for each input pixel such that the multiple input video streams can be mixed into one combined output stream.

In accordance with the teachings of the present disclosure, system 10 is configured to address these issues (and others) in providing an architecture for transferring transparency information in an HDMI video mixing subsystem. In particular implementations, system 10 can be configured to use a pixel (for example, in a non-viewable area) as a key pixel to overlay the HDMI data delivery mechanism with transparency information (i.e., the alpha plane).

The architecture can further include a frame buffering mechanism configured to use that system to deliver video frames (and their associated alpha content) to a video mixing device. This stands in contrast to blunt chromakey matching activities used to create alpha values. The chromakey matching operations were problematic because when images were upscaled/downscaled, new color values (artifacts) were introduced that made the chromakey matching system fail in unpredictable ways. Hence, when image data is scaled, new colors can be created that previously did not exist. Certain algorithms search for particular colors (e.g., key information) in order to adjust how images are rendered on a given screen. In essence, when the colors are changed, this key information can no longer be readily identified. Moreover, the chromakey matching system was less flexible than the alpha plane system because it allowed only one transparency level per-color (e.g., the system would be incapable of fading in a yellow box with more transparency at the box's edges than at the box's center).

In contrast to these flawed activities, the architecture of the present disclosure does not look for a particular color associated with an image and, instead, identifies a specific position on the screen. At that position, a certain transparency level can be presumed. More specifically, the architecture of the present disclosure offers a scheme for intelligently providing this information to the system. For example, the output value can be determined for particular positions on the screen. The objective in such activities is to have alpha information propagate over the HDMI link such that it can be blended into the system.

Consider a system having two HDMI inputs: HDMI_IN and HDMI_OSD. Each HDMI input can carry video data in Y, Cb, Cr format. Both inputs can be summed together in a MIXER that combines the Y, Cb, Cr components of each pixel from HDMI_IN with the corresponding Y, Cb, Cr components of each pixel from the HDMI_OSD using a weighting factor alpha in order to create an output stream of Y, Cb, Cr pixels (on HDMI_OUT). Note that the weighting factor alpha can be a number between 0 and 1; it can be multiplied against the Y, Cb, Cr components of HDMI_OSD prior to providing them to an adder, while (1-Alpha) is multiplied against the Y, Cb, Cr components of HDMI_IN prior to delivering them to that same adder. The output of that adder can be delivered to the HDMI_OUT interface.

Certain systems create alpha values by chromakey matching (i.e., when a pixel of HDMI_IN matches a key, then alpha is set to a programmable value, and when it does not match the key, then alpha defaults to either 0 or 1). Such schemes fail to respond well to scaling (scaling introduces colors that did not exist in the original image such that the effect of using chromakey matching on scaled images is unpredictable). Such systems also have inherent limitations because each color can have only one corresponding alpha value, which limits what can be done (e.g., when developing a user interface via ON SCREEN DISPLAY).

The architecture of the present disclosure is configured to allow the HDMI_OSD input to be used to deliver an entire plane of alpha values (e.g., one alpha value for each video pixel) even though HDMI standard fails to provide for an alpha channel. In this way, video effects such as semi-transparent borders for ON SCREEN DISPLAY elements can be achieved in a manner that is more flexible than chromakey matching and, further, in a manner supportive of intelligent image upscaling and downscaling.

Additional details about these activities are provided below with reference to particular FIGURES. Before detailing specific operational capabilities of the architecture, a brief discussion is provided for the infrastructure of the architecture of FIGS. 1-2A. Turning to those discussions of the possible physical infrastructure of the present disclosure, camera element 14 can be configured to fasten to any edge (e.g., a top edge) of display 12 (e.g., a flat-screen HD television). Camera element 14 can be included as part of an integrated component (i.e., a single component, a proprietary element, a set-top box, console element 20, etc.) that could include speakers 16 (e.g., an array microphone). Thus, all of these elements (camera element 14, speakers 16, console element 20) can be combined and/or be suitably consolidated into an integrated component that rests on (or that is fixed to, or that is positioned near) display 12. Alternatively, each of these elements are their own separate devices that can be coupled (or simply interact with each other), or be adequately positioned in any appropriate fashion.

In addition, provided in FIG. 2A are a router 34 and a set-top box 32, both of which may be coupled to console element 20. In a particular example, router 34 can be a home wireless router configured for providing a connection to network 30. Alternatively, router 34 can employ a simple Ethernet cable in order to provide network connectivity for data transmissions associated with system 10. Handset 28 can be recharged through a cradle dock 26 (as depicted in FIG. 2A). [Handset 28 may be functional while docked.] Alternatively, handset 28 may be powered by batteries, solar charging, a cable, or by any power source, or any suitable combination of these mechanisms.

Turning to FIG. 2B, FIG. 2B is a simplified block diagram illustrating one possible embodiment of video and transparency mixing module 75. Video and transparency mixing module 75 includes dual frame buffer module 55 and video mixer 80 and, further, can be configured to receive HDMI_OSD data 82 at a first input 92 and to receive HDMI_IN data 84 at a second input 94. HDMI_OSD data 82 and HDMI_IN data 84 may not be formatted as HDMI data and they may be transmitted on any suitable link including Ethernet cables, HDMI cables, universal serial bus (USB) cables, or any other suitable link configured for carrying data or energy between two devices. In a particular embodiment, dual frame buffer module 55 is deeper than a dual-ranked frame buffer (e.g. 3 ranks in each buffer, or 4 ranks in each buffer, etc.). Hence, multiple levels or tiers can be provisioned in each buffer.

Dual frame buffer module 55 can be configured to receive HDMI_OSD data 82 from first input 92. In a particular implementation, dual frame buffer module 55 includes a video data frame buffer 76 and an alpha frame buffer 78. In one particular embodiment, dual frame buffer module 55 is configured to process pixel (0,0) of each video frame in HDMI_OSD data 82. If pixel (0,0) is not pure black, then dual frame buffer module 55 is configured to store the video frame in video data frame buffer 76. If pixel (0,0) is pure black, then dual frame buffer module 55 is configured to store the video frame in alpha frame buffer 78. [Note that some other indicator may equally be used, for example, pixel (0,0) may be pure white, blue, or some other color. Also, a pixel other than pixel (0,0) may be used.]

Video data frame buffer 76 can be configured to store two separate video frames (e.g., VIDEO_FRAME_A and VIDEO_FRAME_B). The output of video data frame buffer 76 can be based on a "last frame written" algorithm (i.e., when it is time to read out a video frame, then whichever video frame (VIDEO_FRAME_A or VIDEO_FRAME_B) that was the last frame written can be read out.) The "last frame written" algorithm allows the output video frame to be inconstant such that if a new video frame is not written, then the last video frame repeats.

Alpha frame buffer 78 can be configured to store two separate transparency frames (e.g., alpha planes: ALPHA_PLANE_A and ALPHA_PLANE_B). The output of alpha frame buffer 78 can be coordinated with the output of video data frame buffer 76 such that the output of alpha frame buffer 78 (ALPHA_PLANE_A or ALPHA_PLANE_B) is the last transparency frame (e.g., alpha plane) written prior to the writing of the current video frame being read out (e.g., whichever alpha plane (ALPHA_PLANE_A or ALPHA_PLANE_B) was the last alpha plane written prior to the writing of the current output video frame (VIDEO_FRAME_A or VIDEO_FRAME_B) can be read out.) The output of video data frame buffer 76 and alpha frame buffer 78 can be transmitted to video mixer 80 as video data 86 and transparency data 88.

Video mixer 80 receives HDMI_IN data 84, transparency data 88, and video data 86. Transparency data 88 can be used to determine the transparency of each pixel in the video frame that is contained in video data 86. The video frame that is contained in video data 86 can be then overlaid on the video frame in HDMI_IN data 84 to produce an HDMI transmission 90 that includes transparency information. Hence, system 10 uses HDMI_OSD data 82 to deliver an entire plane of transparency values for on screen display or overlay elements (e.g., one alpha value for each video pixel) such that video effects (e.g., semi-transparent borders) support image upscaling and downscaling.

Figure 2C:
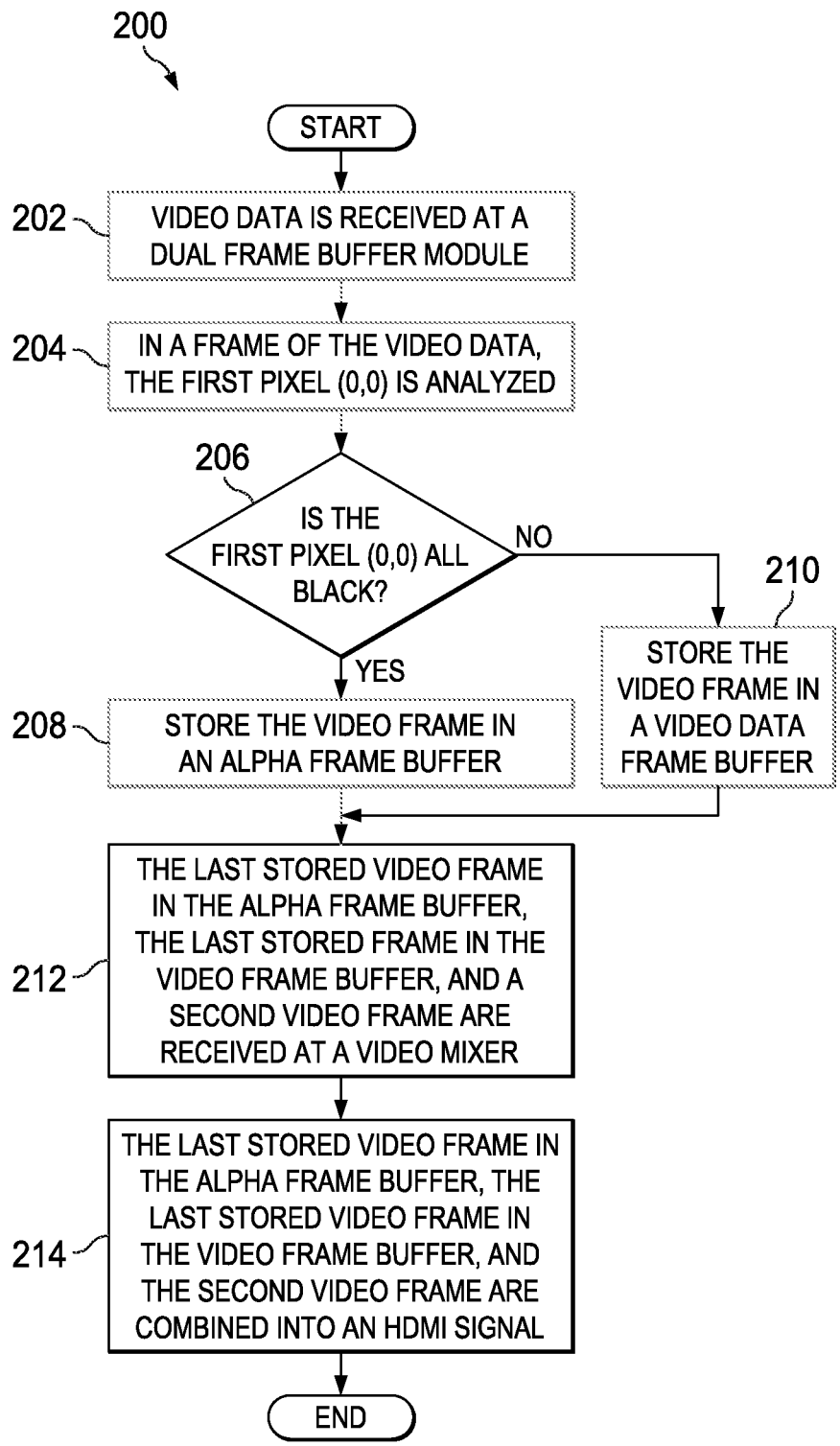
FIG. 2C is a simplified flow diagram illustrating potential operations associated with one embodiment of the present disclosure.

Turning to FIG. 2C, FIG. 2C is a simplified flowchart 200 illustrating one potential operation associated with the present disclosure. In 202, video data can be received at a dual frame buffer module. For example, HDMI_OSD data 82 may be received at first input 92 of dual frame buffer module 55. At 204, in a frame of the video data, the first pixel (0,0) can be analyzed. For example, this could involve dual frame buffer module 55 analyzing the first pixel (0,0) of the first frame of HDMI_OSD data 82. In 206, the dual frame buffer module determines if the first pixel (0,0) is black. For example, dual frame buffer module 55 may determine if the first pixel (0,0) is black.

If the dual frame buffer module determines that the first pixel (0,0) is black, then the video frame can be stored in an alpha frame buffer, as illustrated in 208. For example, if the first pixel (0,0) is all black, then the video frame in HDMI_OSD data 82 may be stored in alpha frame buffer 78. However, if the dual frame buffer module determines that the first pixel (0,0) is not all black, then the video frame can be stored a video data frame buffer, as illustrated in 210. For example, if the first pixel (0,0) is not all black, then the video frame in HDMI_OSD data 82 may be stored in video data frame buffer 76.

In 212, the last stored video frame in the alpha frame buffer, the last stored video frame in the video data frame buffer, and a second video frame are received at a video mixer. For example, video mixer 80 may receive video data 86 and transparency data 88 from dual frame buffer module 55 and HDMI_IN data 84. In 214, the last stored video frame in the alpha frame buffer, the last stored video frame in the video data frame buffer, and the second video frame are combined into a HDMI transmission. For example, video mixer 80 may combine video data 86, transparency data 88, and HDMI_IN data 84 into HDMI transmission 90.

In operation of an example implementation, system 10 can be used to conduct video calls (e.g., supporting both inbound and outbound directional call flows). For the inbound call scenario, on reception of an inbound call request, console element 20 can be configured to contact the paired handset(s) 28 (e.g., waking it from sleep, where appropriate). Handset 28 can be configured to play a ringtone, turn on an LED indicator, and/or display UI 18 (e.g., including the incoming caller's contact information). If configured to do so, UI 18 can also be displayed over any passthrough video sources on console element 20. If the callee chooses to answer the call with one of the call control buttons, console element 20 offers its media capabilities to the caller's endpoint. In certain example implementations, by default, audio media can be offered at the start of the call. At any time during a voice call, both parties can agree to enter into a full video session (e.g., referred to as a "go big" protocol) at which point video media is negotiated. As a shortcut, the intention to "go big" can be pre-voted at the start of the call. At any time after video media is flowing, the call can also be de-escalated back to an audio-only call. In certain instances, there could be an option to automatically answer incoming calls as immediate full-video sessions.

In the case of an ad hoc outbound call, the user can select a callee from their contact list, select a callee via a speed dial setting, or alternatively the user can enter any type of identifier (e.g., a telephone number, a name, a videoconferencing (e.g., Telepresence, manufactured by Cisco, Inc. of San Jose, Calif.) number directly). If the callee answers, the call scenario proceeds, similar to that of an inbound call. In the case of a hold and resume scenario, an in-call UI 18 signal can be provided to put a call on hold, and subsequently the call can be resumed at a later time. Note that in other instances, system 10 can be used to execute scheduled calls, call transfer functions, multipoint calls, and/or various other conferencing capabilities.

In the case of the consumer user attempting a communication with a business entity, certain parameters may be changed based on interoperability issues. For example, secure business endpoints may be supported, where signaling and media would be secure (both audio and video). Appropriate messages can be displayed in UI 18 to inform the user of the reason for any security-forced call drops. Signaling can be considered secure by having both a business exchange and consumer networks physically co-located, or by using a secure tunnel (e.g., a site-to-site virtual private network (VPN) tunnel) between the two entities.

Turning to additional details associated with the infrastructure of system 10, in one particular example, camera element 14 is a video camera configured to capture, record, maintain, cache, receive, and/or transmit image data. This could include transmitting packets over network 30 to a suitable next destination. The captured/recorded image data could be stored in camera element 14 itself, or be provided in some suitable storage area (e.g., a database, a server, console element 20, etc.). In one particular instance, camera element 14 can be its own separate network device and have a separate IP address. Camera element 14 could include a wireless camera, a high-definition camera, or any other suitable camera device configured to capture image data.

Camera element 14 may interact with (or be inclusive of) devices used to initiate a communication for a video session, such as a switch, console element 20, a proprietary endpoint, a microphone, a dial pad, a bridge, a telephone, a computer, or any other device, component, element, or object capable of initiating video, voice, audio, media, or data exchanges within system 10. Camera element 14 can also be configured to include a receiving module, a transmitting module, a processor, a memory, a network interface, a call initiation and acceptance facility such as a dial pad, one or more displays, etc. Any one or more of these items may be consolidated, combined, eliminated entirely, or varied considerably and those modifications may be made based on particular communication needs.

Camera element 14 can include a high-performance lens and an optical zoom, where camera element 14 is capable of performing panning and tilting operations. The video and the audio streams can be sent from camera element 14 to console element 20, where they are mixed into the HDMI stream. In certain implementations, camera element 14 can be provisioned as a light sensor such that the architecture can detect whether the shutter of the camera is open or closed (or whether the shutter is partially open.) An application program interface (API) can be used to control the operations of camera element 14.

Display 12 offers a screen on which video data can be rendered for the end user. Note that as used herein in this Specification, the term 'display' is meant to connote any element that is capable of delivering image data (inclusive of video information), text, sound, audiovisual data, etc. to an end user. This would necessarily be inclusive of any panel, plasma element, television (which may be high-definition), monitor, computer interface, screen, Telepresence devices (inclusive of Telepresence boards, panels, screens, surfaces, etc.), or any other suitable element that is capable of delivering/rendering/projecting such information.

In certain implementations, handset 28 can be used as a remote control for system 10. For example, handset 28 can offer a wireless remote control that allows it to communicate with display 12, camera element 14, and/or console element 20 via a wireless network link (e.g., infrared, Bluetooth, any type of IEEE 802.11-based protocol, etc.). Handset 28 can further be provisioned as a wireless mobile phone (e.g., a speakerphone device) with various dial pads: some of which are shown by way of example in FIG. 1. In other implementations, handset 28 operates as a learning mechanism and/or a universal remote controller, which allows it to readily control display 12, camera element 14, console element 20, and/or any audiovisual (AV) receiver device (e.g., managing functions such as ON/OFF, volume, input select, etc. to enhance the overall video experience). In a particular set of examples, a specific button on handset 28 can launch UI 18 for navigating through any number of options provided in submenus of the UI software. Additionally, a dedicated button can be used to make/answer calls, end calls, turn on/off camera element 14, turn on/off the microphone on, turn on/off console element 20, etc. Furthermore, a set of playback controls can be provided on handset 28 in order to control the video data being rendered on display 12.

Note that handset 28 can be configured to launch, control, and/or manage UI 18. In one particular instance, UI 18 includes a clover design having four separate functions along its perimeter (i.e., up, down, left, right). The center of UI 18 can be used to initiate calls or to configure call options. The lower widget icon may be used to adjust settings, inclusive of controlling profile information, privacy settings, console settings, etc. The right-hand icon (when selected) can be used to view video messages sent to a particular user. The upper icon can be used to manage contacts (e.g., add, view, and connect to other individuals). The director's card (provided as the left icon) can be used to record and send video messages to other individuals. It is imperative to note that these menu choices can be changed considerably without departing from the scope of the present disclosure. Additionally, these icons may be customized, changed, or managed in any suitable fashion. Furthermore, the icons of UI 18 are not exhaustive, as any other suitable features may be provided in the context of UI 18. Along similar lines, the submenu navigation choices provided beneath each of these icons can include any suitable parameter applicable to videoconferencing, networking, user data management, profiles, etc.

Network 30 represents a series of points or nodes of interconnected communication paths for receiving and transmitting packets of information that propagate through system 10. Network 30 offers a communicative interface between any of the components of FIGS. 1 and 2A and remote sites, and may be any local area network (LAN), wireless local area network (WLAN), metropolitan area network (MAN), wide area network (WAN), VPN, Intranet, Extranet, or any other appropriate architecture or system that facilitates communications in a network environment.

Console element 20 is configured to receive information from camera element 14 (e.g., via some connection that may attach to an integrated device (e.g., a set-top box, a proprietary box, etc.) that sits atop (or near) display 12 and that includes (or is part of) camera element 14). Console element 20 may also be configured to control compression activities, or additional processing associated with data received from camera element 14. Alternatively, the actual integrated device can perform this additional processing before image data is sent to its next intended destination. Console element 20 can also be configured to store, aggregate, process, export, or otherwise maintain image data and logs in any appropriate format, where these activities can involve processor 40*b* and memory element 42*b*. Console element 20 is a video element that facilitates data flows between endpoints and a given network. As used herein in this Specification, the term 'video element' is meant to encompass servers, proprietary boxes, network appliances, set-top boxes, or other suitable device, component, element, or object operable to exchange video information with camera element 14.

Console element 20 may interface with camera element 14 through a wireless connection, or via one or more cables or wires that allow for the propagation of signals between these elements. These devices can also receive signals from an intermediary device, a remote control, handset 28, etc. and the signals may leverage infrared, Bluetooth, WiFi, electromagnetic waves generally, or any other suitable transmission protocol for communicating data (e.g., potentially over a network) from one element to another. Virtually any control path can be leveraged in order to deliver information between console element 20 and camera element 14. Transmissions between these two devices can be bidirectional in certain embodiments such that the devices can interact with each other. This would allow the devices to acknowledge transmissions from each other and offer feedback where appropriate. Any of these devices can be consolidated with each other, or operate independently based on particular configuration needs. In one particular instance, camera element 14 is intelligently powered using a USB cable. In a more specific example, video data is transmitted over an HDMI link, and control data is communicated over a USB link.

In certain examples, console element 20 can have an independent light sensor provisioned within it to measure the lighting in a given room. Subsequently, the architecture can adjust camera exposure, shuttering, lens adjustments, etc. based on the light that is detected in the room. Camera element 14 is also attempting to provide this function; however, having a separate light sensor offers a more deterministic way of adjusting these parameters based on the light that is sensed in the room. An algorithm (e.g., within camera element 14 and/or console element 20) can be executed to make camera adjustments based on light detection. In an IDLE mode, the lens of camera element 14 can close automatically. The lens of camera element 14 can open for an incoming call, and can close when the call is completed (or these operations may be controlled by handset 28). The architecture can also account for challenging lighting environments for camera element 14. For example, in the case of bright sunlight behind an individual, system 10 can optimize the exposure of the individual's face.

In regards to audio data (inclusive of voice data), in one particular example, speakers 16 are provisioned as a microphone array, which can be suitably calibrated. Note that in certain consumer applications, the consumer's home system is the variant, which is in contrast to most enterprise systems that have fixed (predictable) office structures. Camera element 14 can include an array of eight microphones in a particular example, but alternatively any number of microphones can be provisioned to suitably capture audio data. The microphones can be spaced linearly, or logarithmically in order to achieve a desired audio capture function. MicroElectrical-Mechanical System (MEMS) technology can be employed for each microphone in certain implementations. The MEMS microphones represent variations of the condenser microphone design, having a built in analog-to-digital converter (ADC) circuits.

The audio mechanisms of system 10 can be configured to add a delay to the system in order to ensure that the acoustics function properly. In essence, the videoconferencing architecture does not inherently know the appropriate delay because of the unique domain of the consumer. For example, there could be a home theater system being used for acoustic purposes. Hence, system 10 can determine the proper delay, which would be unique to that particular environment. In one particular instance, the delay can be measured, where the echoing effects from the existing speakers are suitably canceled. An embedded watermarking signature can also be provided in each of the speakers, where the signature can be detected in order to determine an appropriate delay. Note that there is also some additional delay added by display 12 itself because the clocking mechanism is generally not deterministic. The architecture can dynamically update the delay to account for this issue. Many of these functions can be accomplished by console element 20 and/or camera element 14: both of which can be intelligently configured for performing these function adjustments.

The architecture can also send out a signal (e.g., white noise) as a test for measuring delay. In certain instances, this function is done automatically without having to prompt the user. The architecture can also employ wireless microphone 24, which can use a dedicated link in certain implementations. Wireless microphone 24 can be paired (akin to Bluetooth pairing) such that privacy issues can be suitably addressed. Wireless microphone 24 can be taken anywhere (e.g., in the room, in the house, etc.) and still provide appropriate audio functions, where multiplexing would occur at console element 20 for this particular application. Similarly, there could be an incarnation of the same for a given speaker (or the speaker/microphone can be provided together as a mobile unit, which is portable). The speaker could be similarly used anywhere in the room, in the house, etc. It should be noted that this is not only a convenience issue, but also a performance issue in suitably capturing/delivering audio signals having the proper strength and quality.

In terms of call answering and video messaging, handset 28 allows an individual to have the option of taking a voice call instead of answering a videoconferencing call. This is because handset 28 can have the intelligence to operate purely as a mobile phone. For this reason, handset 28 can readily be substituted/replaced by various types of smartphones, which could have an application provisioned thereon for controlling the videoconferencing activities. Handset 28 also affords the ability to be notified (through the handset itself) of an incoming videoconferencing call, with the option of rendering that call on display 12. A simple visual alert (e.g., an LED, a vibration, etc.) can be used to indicate a video message is waiting to be heard/watched.

The video messaging can include snapshots of video frames that would be indicative of the actual message images. In the user's video Inbox, the current videomail can include images of the actual messages being stored for future playback. For example, if the message were from the user's mother, the videomail would include a series of snapshots of the mother speaking during that videomail. In one particular example, the actual videomail is sampled at certain time intervals (e.g., every 10 seconds) in order to generate these images, which serve as a preview of the videomail message. Alternatively, the snapshots can be limited in number. In other instances, the snapshots are arbitrarily chosen, or selected at the beginning, the middle, and the end of the video message. In other implementations, the snapshots are taken as a percentage of the entire video message (e.g., at the 20% mark, at the 40% mark, and at the 100% mark). In other examples, the videomail in the Inbox is previewed by just showing the image associated with that particular user ID that authored the video message.

In operation of an example involving a user watching a normal television program on display 12, an incoming call can be received by the videoconferencing platform. The notification can arrive even if the television is off (e.g., through speakers of system 10). If an individual chooses to answer the call, then the videoconferencing platform takes over the television. In one example involving a digital video recorder (DVR), the programming can be paused. In other examples, the user can keep the call minimized so (for example) a user could speak with a friend while watching a football game. Console element 20 can be configured to record a message, and then send that message to any suitable next destination.

For example, the user can send a link to someone for a particular message. The user can also use Flip Share or YouTube technology to upload/send a message to any appropriate destination. In a general sense, the messages can be resident in a network cloud such that they could still be accessed (e.g., over a wireless link) even if the power were down at the residence, or if the user were not at the residence.

The user can also switch from a video call to handset 28, and from handset 28 back to a video call. For example, the user can initiate a call on a smartphone and subsequently transition it to the videoconferencing display 12. The user can also do the reverse, where the user starts at the videoconferencing platform and switches to a smartphone. Note that wireless microphone 24 can operate in a certain, preferred range (e.g., 12 to 15 feet), where if the individual moves further away from that range, users could elect to transition to handset 28 (in a more conventional telephony manner). Consider the case where the room becomes noisy due to family members, and the user on the videoconferencing call elects to simply switch over to a smartphone, to a given landline, etc.

Motion detection can also be used in order to initiate, or to answer video calls. For example, in the case where a remote control is difficult to find in a living room, a simple handwaving gesture could be used to answer an incoming video call. Additionally, the system (e.g., camera element 14 cooperating with console element 20) can generally detect particular body parts in order to execute this protocol. For example, the architecture can distinguish between a dog running past display 12, versus handwaving being used to answer an incoming call. Along similar lines, the user can use different gestures to perform different call functions (e.g., clasping his hands to put a call on hold, clapping his hands to end the call, pointing in order to add a person to a contact list, etc.).

Note that Wi-Fi is fully supported by system 10. In most videoconferencing scenarios, there can be massive amounts of data (much of which is time critical) propagating into (or out of) the architecture. Video packets (i.e., low-latency data) propagating over a Wi-Fi connection can be properly accommodated by system 10. In one particular example, nonmoving (static) background images can be segmented out of the video image, which is being rendered by display 12. The architecture (e.g., through console element 20) can then lower the bit rate significantly on those images. Allocations can then be made for other images that are moving (i.e., changing in some way). In certain example implementations, face-detection algorithms can also be employed, where the video is optimized based on those algorithm results.

Certain phone features allow for handset 28 to offer speed dialing, and a mechanism for saving contacts into a contact list. Calls can be made to users on the speed dial list or the contact list with a single button push on handset 28. Additionally, calls can be initiated using either the UI of handset 28, or the on-screen UI 18. Furthermore, calls can be initiated from a web portal, where the caller can confirm call initiation at the endpoint by pressing voice-only, or a video call button on handset 28. Also, calls can be initiated from other web pages via a call widget (e.g., calling a person by clicking on his Facebook object). In addition, the caller can look up a recipient in an online directory (e.g., a directory of all Telepresence users stored in a database), place a call to that recipient, and save the recipient's contact information into the contact list. In terms of receiving videoconferencing calls, incoming calls can be accepted with a single button push on handset 28. Call recipients have the opportunity to accept or reject a call. Rejected calls can be routed to videomail (if permitted by the recipient's safety settings).

In regards to call quality, if the available bandwidth decreases during a call, the video resolution is scaled down, as appropriate. If the available bandwidth increases during a call, the video resolution can be scaled up. An on-screen icon can be provided on display 12 to inform the user of the quality of his videoconferencing experience. The purpose of this information can be to inform the user of a poor experience, potentially being caused by network conditions, and that the user can improve his experience by upgrading his broadband service. When communicating with a Webcam, the picture on display 12 can be windowed inside a black frame: regardless of the actual quality of the Webcam video.

In regards to videomail, when a call cannot be answered in real time, it is not lost, but rather, forwarded automatically to videomail. Videomail can be accessed from the videoconferencing system, a web portal, a smartphone, laptop, or any other suitable endpoint device to be used by a user. Note that the user is afforded the ability to set a designated interval for when an incoming counterparty would be relegated to the user's videomail Inbox. The term 'designated interval' is inclusive of a number of rings, a certain time period (e.g., in seconds), or a zero interval, in which case the counterparty's video call request would be immediately routed to the user's videomail. In certain embodiments, the 'designated interval' has a default configured by an administrator.

Videomail can be stored in the network (e.g., in the cloud) in particular implementations of system 10. Alternatively, the videomail can be stored locally at the consumer's residence (e.g., at a laptop, a personal computer, an external hard drive, a server, or in any other appropriate data storage device). Videomail can be played with the following minimum set of playback controls: Play, Pause, Stop, Fast or Skip Forward, Fast or Skip Reverse, Go Back to Start. In a particular implementation, videomail is only viewed by the intended recipient. Notifications of new videomail can be sent to other devices by short message service (SMS) text message (e.g., to a mobile device) or by email. An immediate notification can also be shown on handset 28. For video recordings, videos can be recorded and stored in the network for future viewing and distribution. Calls can similarly be recorded in real time and stored in the network for future viewing and distribution. When sharing recorded videos with videoconferencing users, the architecture can specify exactly which videoconferencing users have access to the video data. When the share list contains one or more email addresses, access control is not enabled in particular implementations (e.g., any individual who has the URL could access the video).

In terms of media sharing, system 10 can provide a simple mechanism for sharing digital photos and videos with removable flash media, flash and hard-drive high definition digital camcorders, digital still cameras, and other portable storage devices. This can be fostered by supporting an external USB connection for these devices to the USB port, which can be provisioned at console element 20, display 12, camera element 14, a proprietary device, or at any other suitable location.

The media sharing application (e.g., resident in console element 20) supports playback of compressed AV file media that is stored on the USB device. Furthermore, this media sharing can be supported via an external HDMI connection for these devices to the HDMI port. System 10 can also provide a mechanism for sharing digital photos and videos that are on a computer, on a Network Attached Storage (NAS) device, on the local network, etc. The mechanism can be universal plug and play (UPnP)/digital living network alliance (DLNA) renderer compliant. The media sharing application can also provide a mechanism for sharing digital photos and videos that are on either a photo or video sharing site (e.g., Flickr, YouTube, etc.), as discussed herein.

System 10 can also provide a mechanism for viewing broadcast HDTV programs (e.g., watching the Superbowl) with the HDTV set-top box HDMI AV feed displayed in picture-in-picture (PIP) with the call video. Continuing with this example, the Super Bowl broadcast feed can be from a local set-top box and not be shared. Only the call video and voice would be shared in this example. The audio portion of the call can be redirected to handset 28 (e.g., speakerphone by default). The audio from the local TV can be passed through to HDMI and optical links (e.g., TOSlink outputs).

In an example scenario, initially the game video can fill the main screen and the call video could be in the smaller PIP. The audio for the game can pass through the box to the television, or to AV receiver surround-sound system. The audio for the video call would be supported by handset 28. In a different scenario, while watching the game, where one caller prefers to switch the main screen from the game to the video call (e.g., during halftime), then the following activities would occur. [Note that this is consistent with the other PIP experiences.] The call video can fill the main screen, where the game fills the smaller PIP window. The audio for the video call can move to the TV or to the AV receiver surround-sound system, and the game audio can switch to handset 28. Note that none of these activities requires the user to be "off camera" to control the experience: meaning, the user would not have to leave his couch in order to control/coordinate all of these activities.

In one particular example, console element 20 and camera element 14 can support any suitable frame rate (e.g., a 50-60 frames/second (fps) rate) for HD video for local, uncompressed inputs and outputs. Additionally, the video (e.g., the HDMI 1.3 video) can be provided as a digital signal input/output for local, uncompressed inputs and outputs. There is a passthrough for high-bandwidth Digital Content Protection (HDCP) data for local, uncompressed inputs and outputs from HDMI.

In regards to audio support, HDMI audio can be provided as a digital signal input/output. There can also be a stereo analog line-level output to support legacy devices in the environment. This is in addition to a digital audio output, which may be in the form of an optical link output such as a TOSlink output. For the audiovisual switching activities, audio and video can be patched from inputs, videoconferencing video, or other generated sources, to a local full-screen output. The architecture can offer a protocol for automatically turning on and selecting the correct source of the HDTV (along with any external audio system, when the audiovisual configuration allows for this while answering a call). This feature (and the other features of handset 28) can be implemented via infrared, Bluetooth, any form of the IEEE 802.11 protocol, HDMI-Consumer Electronics Control (CEC), etc.

In regards to camera element 14, the architecture can provide a full-motion video (e.g., at 30 fps). Participants outside of the range may be brought into focus via autofocus. Camera element 14 can provide identification information to console element 20, a set-top satellite, and/or any other suitable device regarding its capabilities. Camera element 14 can be provisioned with any suitable pixel resolution (e.g., 1280× 720 pixel (720p) resolution, 1920×1080 pixel (1080p) resolution, etc.). If depth of focus is greater than or equal to two meters, then manual focus can be suggested for setup activities, and the autofocus feature/option would be desirable for the user. In operation, the user can manually focus camera element 14 on his sofa (or to any other target area) during setup. If successful, this issue would not have to be revisited.

If depth of focus is less than or equal to one meter (which is commonly the case) then autofocus can be implemented. A digital people-action finder may also be provisioned for system 10 using camera element 14. Both pan and tilt features are available manually at setup, and during a video call. Similarly, zoom is available manually at set-up time, and during a video call.

Handset 28 may be equipped with any suitable microphone. In one particular implementation, the microphone is a mono-channel mouthpiece microphone optimized for capturing high quality audio in a voice range. The microphone may be placed to optimize audio capture with standard ear-mouth distance. Handset 28 can have a 3.5 mm jack for a headphone with microphone. Note that system 10 can support Home Network Administration Protocol (HNAP) and, further, be compatible with Network Magic, Linksys Easy-Link Advisor, or any other suitable home network management tool.

In one example, handset 28 has an infrared transmitter for controlling standard home theatre components. The minimum controls for handset 28 in this example can be power-on, input select, volume up/down, and audio output mute of the TV and AV receiver. Console element 20 (along with camera element 14) can have an infrared receiver to facilitate pairing of the videoconferencing system with other remote controls, which can allow other remotes to control the videoconferencing system. Suitable pairing can occur either by entering infrared codes into handset 28, or by pointing a remote from the target system at an infrared receiver of the videoconferencing system (e.g., similar to how universal remotes learn and are paired).

For call management, system 10 can allow a user to initiate, accept, and disconnect calls to and from voice-only telephones (e.g., using handset 28 in a voice-only mode). Call forwarding can also be provided such that video calls are forwarded between console elements 20 at each endpoint of the video session. Additionally, announcements can be provided such that a default announcement video can be played to callers who are leaving a videomail. A self-view is available at any time, and the self-view can be triggered through a user demand by the user pressing a button on handset 28. The self-view can be supported with a mirror mode that shows the reverse image of the camera, as if the user was looking in a mirror. This can occur at any time, including while idle, while on a videoconferencing call, while on an audio-only call, etc.

Figure 3:
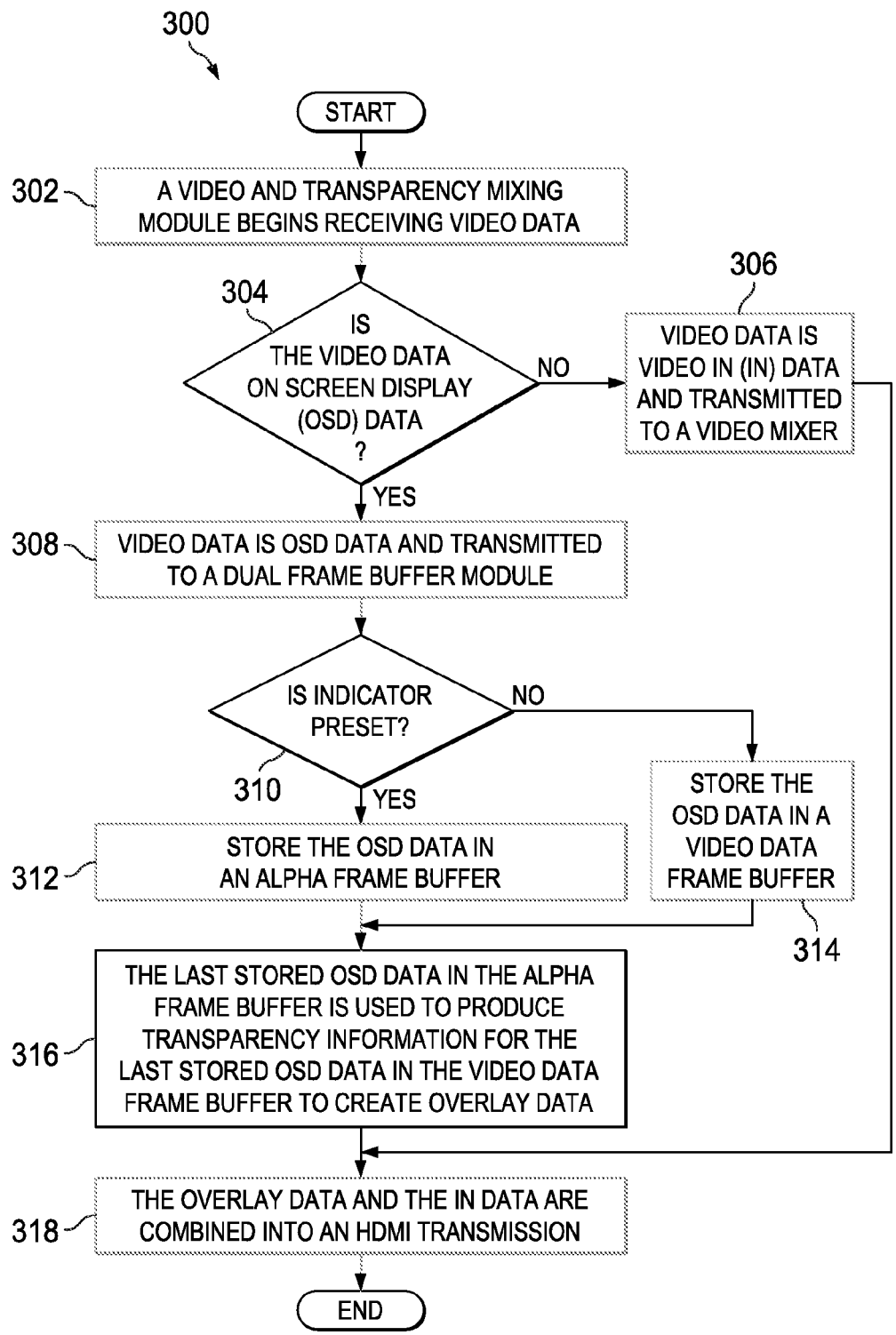
FIG. 3 is a simplified flow diagram illustrating potential operations associated with one embodiment of the present disclosure.

Turning to FIG. 3, FIG. 3 is a simplified flowchart 300 illustrating one potential operation associated with the present disclosure. In 302, a video and transparency mixing module begins receiving video data. For example, video and transparency mixing module 75 may begin receiving HDMI_OSD data 82 at first input 92 and HDMI_IN data 84 at second input 94. In 304, the video and transparency mixing module determines if the video data is on screen display (OSD) data (e.g., OSD data may be video data and transparency information for the video data). If the video and transparency mixing module determines that the video data is not OSD data, then the video data can be designated as video in (IN) data, as illustrated in 306. For example, if video data (e.g., HDMI_IN data 84) is received at second input 94, then the video data may designated as IN data. If the video and transparency mixing module determines that the video data is OSD data, then the video data can be designated as OSD data and, further, can be transmitted to a dual frame buffer module, as illustrated in 308. For example, if the video data is received at first input 92, then the video data may be designated as OSD data and sent to dual frame buffer module 55.

In 310, the dual frame buffer module determines if an indicator is present (e.g., the first pixel (0,0) of the OSD data is all black). If the dual frame buffer module determines that the indicator is present, then the OSD data can be stored in an alpha frame buffer, as illustrated in 312. For example, if the first pixel (0,0) is all black, then the video data in HDMI_OSD data 82 may be stored in alpha frame buffer 78. However, if the dual frame buffer module determines that the indicator is not present, then the OSD data can be stored a video data frame buffer, as illustrated in 314. For example, if the first pixel (0,0) is not all black, then the video data in HDMI_OSD data 82 may be stored in video data frame buffer 76.

In 316, the last stored OSD data in the alpha frame buffer can be used to produce transparency information for the OSD data in the video data frame buffer and, further, create overlay data. For example, transparency data 88 may be used to produce transparency information for video data 86. In 318, the overlay data and the IN data are combined into a HDMI transmission. For example, video mixer 80 may combine video data 86, transparency data 88, and HDMI_IN data 84 into HDMI transmission 90.

Note that in certain example implementations, the video processing functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or any other similar machine, etc.). In some of these instances, memory elements [as shown in FIG. 2A] can store data used for the video enhancement operations described herein (e.g., involving the alpha channel, etc.). This includes the memory element being able to store software, logic, code, or processor instructions that are executed to carry out the activities described in this Specification. A processor can execute any type of instructions associated with the data to achieve the operations detailed herein in this Specification. In one example, the processors [as shown in FIG. 2A] could transform an element or an article (e.g., data) from one state or thing to another state or thing. In another example, the video enhancement activities outlined herein may be implemented with fixed logic or programmable logic (e.g., software/computer instructions executed by a processor) and the elements identified herein could be some type of a programmable processor, programmable digital logic (e.g., FPGA, an erasable programmable read only memory (EPROM), an electrically erasable programmable ROM (EEPROM)) or an ASIC that includes digital logic, software, code, electronic instructions, or any suitable combination thereof.

Note that the equipment of FIG. 2A may share (or coordinate) certain processing operations. Using a similar rationale, their respective memory elements may store, maintain, and/or update data in any number of possible manners. In a general sense, the arrangements depicted in the preceding FIGURE may be more logical in their representations, whereas a physical architecture may include various permutations/combinations/hybrids of these elements. In one example implementation, console element 20 includes software (e.g., as part of the modules of FIG. 2A) to achieve the video enhancement operations, as outlined herein in this document. In other embodiments, these features may be provided externally to any of the aforementioned elements (e.g., included in camera element 14), or included in some other device to achieve these functionalities. Alternatively, several elements may include software (or reciprocating software) that can coordinate in order to achieve the operations, as outlined herein. In still other embodiments, any of the devices of the FIGURES may include any suitable algorithms, hardware, software, components, modules, interfaces, or objects that facilitate these video enhancement operations.

All of the aforementioned devices may further keep information in any suitable memory element (e.g., random access memory (RAM), ROM, EPROM, EEPROM, ASIC, etc.), software, hardware, or in any other suitable component, device, element, or object where appropriate and based on particular needs. Any of the memory items discussed herein (e.g., database, table, key, queue, etc.) should be construed as being encompassed within the broad term 'memory element.' Similarly, any of the potential processing elements, modules, and machines described in this Specification should be construed as being encompassed within the broad term 'processor.' Console element 20 and/or camera element 14 can also include suitable interfaces for receiving, transmitting, and/or otherwise communicating data or information in a network environment.

Note that with the examples provided herein, interaction may be described in terms of two, three, or four elements. However, this has been done for purposes of clarity and example only. In certain cases, it may be easier to describe one or more of the functionalities of a given set of flows by only referencing a limited number of elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain server components, system 10 may be applicable to other protocols and arrangements (e.g., those involving any type of videoconferencing scenarios). Additionally, although camera element 14 has been described as being mounted in a particular fashion, camera element 14 could be mounted in any suitable manner in order to suitably capture video images. Other configurations could include suitable wall mountings, aisle mountings, furniture mountings, cabinet mountings, upright (standing) assemblies, etc., or arrangements in which cameras would be appropriately spaced or positioned to perform its functions.

Furthermore, the users described herein are simply individuals within the proximity, or within the field of view, of display 12. Audience members can be persons engaged in a video conference involving other individuals at a remote site.

Audience members can be associated with corporate scenarios, consumer scenarios, residential scenarios, etc. or associated with any other suitable environment to which system 10 may be applicable.

Moreover, although the previous discussions have focused on videoconferencing associated with particular types of endpoints, handheld devices that employ video applications could readily adopt the teachings of the present disclosure. For example, iPhones, iPads, Google Droids, personal computing applications (i.e., Desktop video solutions), etc. can readily adopt and use the enhanced video processing operations detailed above. Any communication system or device that processes or renders video data (e.g., associated with the alpha channel) would be amenable to the video features discussed herein. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Additionally, system 10 can involve different types of counterparties, where there can be asymmetry in the technologies being employed by the individuals. For example, one user may be using a laptop, while another user is using the architecture of system 10. Similarly, a smartphone could be used as one individual endpoint, while another user continues to use the architecture of system 10. In addition, Webcams can readily be used in conjunction with system 10. Along similar lines, multiparty calls can readily be achieved using the teachings of the present disclosure. Moreover, although system 10 has been illustrated with reference to particular elements and operations that facilitate the communication process, these elements and operations may be replaced by any suitable architecture or process that achieves the intended functionality of system 10.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving overlay data at a dual frame buffer module, which interacts with a video data buffer and an alpha data buffer;
   storing the overlay data as a first video data in the video data buffer if an indicator in the overlay data is not present in the overlay data;
   storing the overlay data as a second video data in the alpha data buffer if the indicator is present, wherein the second video data includes a plane of alpha values; and
   combining last written data in the video data buffer with last written data in the alpha data buffer to create a video output that contains transparency information, wherein the last written data in the alpha data buffer was stored prior to the last written data in the video data buffer being stored.

2. The method of claim 1, wherein the indicator is a pixel in a non-viewable area of the overlay data.

3. The method of claim 2, wherein the indicator is identified as present if the pixel in the non-viewable area of the overlay data is a selected one of a group of elements, the group consisting of:
   a) black;
   b) red;
   c) green; and
   d) blue.

4. The method of claim 1, wherein the indicator is identified as present if pixel 0,0 of the overlay data is black and the indicator is not present if pixel 0,0 of the overlay data is not all black.

5. The method of claim 1, further comprising:
   receiving third video data at a mixer;
   receiving the first video data at the mixer;
   receiving the second video data at the mixer; and
   combining the first video data, the second video data, and the third to produce a high-definition multimedia interface (HDMI) output, wherein the first video data and the second video data are combined such that a pixel transparency value in the second video data is applied to each corresponding pixel in the first video data.

6. The method of claim 1, further comprising:
   combining the first video data with the second video data, wherein combining the first video data and the second video data includes combining Y, Cb, and Cr components of pixels in the first video data with the plane of alpha values in the second video data to produce a high-definition multimedia interface (HDMI) output.

7. The method of claim 1, wherein the overlay data is received using a high-definition multimedia interface (HDMI).

8. The method of claim 1, wherein the last written data in the video data buffer allows an output video frame to be inconsistent such that if a new video frame is not stored, then the last written data in the video data buffer is read out.

9. Logic encoded in non-transitory media that includes code for execution and when executed by a processor operable to perform operations comprising:
   receiving overlay data at a dual frame buffer module, which interacts with a video data buffer and an alpha data buffer, wherein the dual frame buffer module includes buffers, which have two or more ranks provisioned therein;
   storing the overlay data as a first video data in the video data buffer if an indicator in the overlay data is not present in the overlay data;
   storing the overlay data as a second video data in the alpha data buffer if the indicator is present, wherein the second video data includes a plane of alpha values; and
   combining last written data in the first video data buffer with last written data in the alpha data buffer to create a video output that contains transparency information, wherein the last written data in the alpha data buffer was stored prior to the last written data in the video data buffer being stored.

10. The logic of claim 9, wherein the indicator is a pixel in a non-viewable area of the overlay data.

11. The logic of claim 10, wherein the indicator is identified as present if the pixel in the non-viewable area of the overlay data is a selected one of a group of elements, the group consisting of:
   a) black;
   b) red;
   c) green; and
   d) blue.

12. The logic of claim 9, wherein the indicator is identified as present if pixel 0,0 of the overlay data is black and the indicator is not present if pixel 0,0 of the overlay data is not all black.

13. The logic of claim 9, further comprising:
receiving third video data at a mixer;
receiving the first video data at the mixer;
receiving the second video data at the mixer; and
combining the first video data, the second video data, and the third to produce a high-definition multimedia interface (HDMI) output, wherein the first video data and the second video data are combined such that a pixel transparency value in the second video data is applied to each corresponding pixel in the first video data.

14. The logic of claim 13, wherein the indicator is identified as present if pixel 0,0 of the overlay data is black and the indicator is not present if pixel 0,0 of the overlay data is not all black.

15. An apparatus, comprising:
a memory element configured to store electronic code;
a processor operable to execute instructions associated with the electronic code; and
a mixing module configured to interface with the processor such that the apparatus is configured for:
receiving overlay data at a dual frame buffer module, which interacts with a video data buffer and an alpha data buffer, wherein the dual frame buffer module includes buffers, which have two or more ranks provisioned therein;
storing the overlay data as a first video data in the video data buffer if an indicator in the overlay data is not present in the overlay data;
storing the overlay data as a second video data in the alpha data buffer if the indicator is present, wherein the second video data includes a plane of alpha values; and
combining last written data in the video data buffer with last written data in the alpha data buffer to create a video output that contains transparency information, wherein the last written data in the alpha data buffer was stored prior to the last written data in the video data buffer being stored.

16. The apparatus of claim 15, wherein the indicator is a pixel in a non-viewable area of the overlay data.

17. The apparatus of claim 16, wherein the indicator is identified as present if the pixel in the non-viewable area of the overlay data is a selected one of a group of elements, the group consisting of:
a) black;
b) red;
c) green; and
d) blue.

18. The apparatus of claim 15, further comprising:
receiving third video data at a mixer;
receiving the first video data at the mixer;
receiving the second video data at the mixer; and
combining the first video data, the second video data, and the third to produce a high-definition multimedia interface (HDMI) output, wherein the first video data and the second video data are combined such that a pixel transparency value in the second video data is applied to each corresponding pixel in the first video data.

19. The apparatus of claim 15, further comprising:
combining the first video data with the second video data, wherein combining the first video data and the second video data includes combining Y, Cb, and Cr components of pixels in the first video data with the plane of alpha values in the second video data to produce a high-definition multimedia interface (HDMI) output.

* * * * *